US012698037B2

(12) United States Patent　　　　　(10) Patent No.: US 12,698,037 B2
Kuipers et al.　　　　　　　　　　　(45) Date of Patent: Aug. 4, 2026

(54) VEHICLE BEAM ASSEMBLY WITH COORDINATED STIFFENING MEMBERS

(71) Applicant: Shape Corp., Grand Haven, MI (US)

(72) Inventors: Matthew Kuipers, Holland, MI (US); Zehua Qin, Norton Shores, MI (US)

(73) Assignee: Shape Corp., Grand Haven, MI (US)

( * ) Notice: Subject to any disclaimer, the term of this patent is extended or adjusted under 35 U.S.C. 154(b) by 348 days.

(21) Appl. No.: 18/309,569

(22) Filed: Apr. 28, 2023

(65) Prior Publication Data

US 2023/0347986 A1　　Nov. 2, 2023

Related U.S. Application Data

(60) Provisional application No. 63/363,785, filed on Apr. 28, 2022.

(51) Int. Cl.
　　*B62D 25/02*　　　(2006.01)
　　*B62D 21/15*　　　(2006.01)
　　*C10G 35/085*　　(2006.01)
(52) U.S. Cl.
　　CPC ......... *B62D 25/025* (2013.01); *B62D 21/157* (2013.01); *C10G 35/085* (2013.01); *C10G 2300/1022* (2013.01); *C10G 2300/1044* (2013.01); *C10G 2300/4006* (2013.01); *C10G 2300/4012* (2013.01); *C10G 2300/70* (2013.01); *C10G 2400/02* (2013.01); *C10G 2400/08* (2013.01)
(58) Field of Classification Search
　　CPC ........................... B62D 25/025; B62D 21/157
　　USPC ............................... 296/187.12, 193.05, 209
　　See application file for complete search history.

(56) References Cited

U.S. PATENT DOCUMENTS

| 1,895,171 A | 1/1933 | Nelson et al. |
| 2,012,057 A | 8/1935 | Swallow |
| (Continued) | | |

FOREIGN PATENT DOCUMENTS

| DE | 102007032245 A1 | 1/2009 |
| DE | 102010003497 A1 | 10/2011 |
| (Continued) | | |

OTHER PUBLICATIONS

International Search Report for Application No. PCT/US2023/060333; mailed May 4, 2023; 4 pp.

(Continued)

*Primary Examiner* — Roger L Pang
(74) *Attorney, Agent, or Firm* — Bodman PLC

(57) ABSTRACT

A vehicle rocker assembly includes one or more of a sill outer or a sill inner to define an elongated hollow interior. The vehicle rocker assembly also includes a stiffening member disposed within the hollow interior. The rocker insert includes a first stiffening member having a top wall, a bottom wall, and a side wall. The rocker insert also includes a second stiffening member including a plurality of wall sections that each include an upper portion engaged with the top wall and a lower portion engaged with the bottom wall at a location spaced along the length of the rocker insert from the upper portion. The top and bottom walls of the first stiffening member are configured to be supported by the second stiffening member when undergoing the inboard lateral impact force to increase lateral bending strength of the rocker insert.

18 Claims, 15 Drawing Sheets

(56) References Cited

U.S. PATENT DOCUMENTS

| | | | |
|---|---|---|---|
| 4,221,413 A * | 9/1980 | Bonnetain | B60R 19/18 |
| | | | 293/122 |
| 5,680,886 A | 10/1997 | Ohtsuka | |
| 6,435,601 B1 | 8/2002 | Takahara | |
| 7,963,378 B2 | 6/2011 | Glance et al. | |
| 9,493,190 B1 | 11/2016 | Alwan et al. | |
| 9,725,118 B2 | 8/2017 | Alwan et al. | |
| 10,011,304 B1 | 7/2018 | Donabedian et al. | |
| 10,046,422 B2 | 8/2018 | Baldwin | |
| 10,155,542 B2 | 12/2018 | Gao et al. | |
| 10,183,638 B2 | 1/2019 | Zannier | |
| 10,279,843 B2 | 5/2019 | Nakagawa et al. | |
| 10,328,978 B2 | 6/2019 | Yang et al. | |
| 10,370,040 B1 | 8/2019 | Cooper et al. | |
| 10,399,602 B2 | 9/2019 | Jun et al. | |
| 10,835,942 B2 | 11/2020 | Weykamp et al. | |
| 11,046,367 B2 | 6/2021 | Arvidsson et al. | |
| 11,292,407 B2 | 4/2022 | Riva | |
| 11,535,298 B2 | 12/2022 | Son et al. | |
| 11,661,111 B2 | 5/2023 | Kuipers et al. | |
| 11,745,802 B2 | 9/2023 | Song | |
| 12,043,314 B2 | 7/2024 | Bodin et al. | |
| 12,415,569 B2 | 9/2025 | Kuipers et al. | |
| 12,448,049 B2 | 10/2025 | Munjurulimana et al. | |
| 2019/0256150 A1 | 8/2019 | Cooper et al. | |
| 2019/0264769 A1 | 8/2019 | Gergely et al. | |
| 2020/0262491 A1 | 8/2020 | Shannon et al. | |
| 2021/0268976 A1* | 9/2021 | Gibeau | B60R 19/18 |
| 2021/0339803 A1 | 11/2021 | Haupt et al. | |
| 2021/0380173 A1 | 12/2021 | Kim | |
| 2022/0063731 A1 | 3/2022 | Tsubaki et al. | |
| 2022/0212720 A1 | 7/2022 | Oxley et al. | |
| 2022/0250565 A1 | 8/2022 | Godthi et al. | |
| 2022/0258802 A1 | 8/2022 | Tsubaki et al. | |
| 2022/0289298 A1 | 9/2022 | Kuipers | |
| 2022/0315110 A1 | 10/2022 | Ignes et al. | |
| 2022/0410982 A1 | 12/2022 | Hihara | |
| 2023/0011721 A1 | 1/2023 | Boettcher et al. | |
| 2023/0016200 A1 | 1/2023 | Matsui et al. | |
| 2023/0072451 A1 | 3/2023 | Song | |
| 2023/0102921 A1 | 3/2023 | Odhekar et al. | |
| 2023/0108456 A1 | 4/2023 | Karlsson et al. | |
| 2023/0111879 A1 | 4/2023 | Oxley et al. | |
| 2023/0126494 A1 | 4/2023 | Nihei | |
| 2023/0147528 A1 | 5/2023 | Qin et al. | |
| 2023/0159107 A1 | 5/2023 | Matecki et al. | |
| 2023/0159110 A1 | 5/2023 | Hwang | |
| 2023/0202578 A1 | 6/2023 | Maruyama | |
| 2023/0202581 A1 | 6/2023 | Maruyama et al. | |
| 2023/0202582 A1 | 6/2023 | Inagaki et al. | |
| 2023/0219628 A1 | 7/2023 | Hong et al. | |
| 2023/0226898 A1 | 7/2023 | Lee et al. | |
| 2023/0303179 A1* | 9/2023 | Kuipers | B62D 25/025 |
| 2023/0347986 A1 | 11/2023 | Kuipers et al. | |
| 2024/0083513 A1 | 3/2024 | Kuipers et al. | |
| 2024/0092426 A1* | 3/2024 | Park | B62D 27/065 |
| 2024/0109401 A1* | 4/2024 | Kuipers | B62D 21/157 |
| 2024/0286685 A1* | 8/2024 | Lee | B62D 25/025 |
| 2024/0308593 A1 | 9/2024 | Kuipers | |
| 2024/0326916 A1 | 10/2024 | Lee | |

FOREIGN PATENT DOCUMENTS

| | | | |
|---|---|---|---|
| DE | 102014012082 A1 | 2/2016 |
| DE | 102012206032 B4 | 6/2017 |
| DE | 102017006057 B4 | 5/2021 |
| EP | 1331160 A1 | 7/2003 |
| EP | 1806271 A2 | 7/2007 |
| EP | 2927101 A1 | 10/2015 |
| EP | 3057851 B1 | 1/2018 |
| EP | 3851335 A1 | 7/2021 |
| FR | 3050165 A1 | 10/2017 |
| JP | H05319301 A | 12/1993 |
| JP | 2004051095 A | 2/2004 |
| JP | 2010274848 A | 12/2010 |
| JP | 2016052834 A | 4/2016 |
| JP | 6566176 B1 | 8/2019 |
| JP | 2021024350 A | 2/2021 |
| JP | 2021146973 A | 9/2021 |
| JP | 6964642 B2 | 10/2021 |
| KR | 102447256 B1 | 9/2022 |
| WO | 2017157886 A1 | 9/2017 |
| WO | 2019059821 A1 | 3/2019 |
| WO | 2020085385 A1 | 4/2020 |
| WO | 2020225766 A1 | 11/2020 |
| WO | 2021019959 A1 | 2/2021 |
| WO | 2021060660 A1 | 4/2021 |
| WO | 2021071410 A1 | 4/2021 |
| WO | 2021116546 A1 | 6/2021 |
| WO | 2021157651 A1 | 8/2021 |
| WO | 2021180403 A1 | 9/2021 |
| WO | 2021234433 A1 | 11/2021 |
| WO | 2021244792 A1 | 12/2021 |
| WO | 2021259840 A1 | 12/2021 |
| WO | 2021259971 A1 | 12/2021 |
| WO | 2022086005 A1 | 4/2022 |
| WO | 2022192706 A1 | 9/2022 |
| WO | 2022234999 A1 | 11/2022 |
| WO | 2022238458 A1 | 11/2022 |
| WO | 2022249782 A1 | 12/2022 |
| WO | 2023004309 A1 | 1/2023 |
| WO | 2023277440 A1 | 1/2023 |
| WO | 2023277441 A1 | 1/2023 |
| WO | 2023277567 A1 | 1/2023 |
| WO | 2023285005 A1 | 1/2023 |
| WO | 2023012056 A1 | 2/2023 |
| WO | 2023014808 A1 | 2/2023 |
| WO | 2023016113 A1 | 2/2023 |
| WO | 2023044429 A1 | 3/2023 |
| WO | 2023052279 A1 | 4/2023 |
| WO | 2023052388 A1 | 4/2023 |
| WO | 2023064868 A1 | 4/2023 |
| WO | 2023069918 A1 | 4/2023 |
| WO | 2023079804 A1 | 5/2023 |
| WO | 2023079805 A1 | 5/2023 |
| WO | 2023081810 A1 | 5/2023 |
| WO | 2023085162 A1 | 5/2023 |
| WO | 2023085689 A1 | 5/2023 |
| WO | 2023088660 A1 | 5/2023 |
| WO | 2023089887 A1 | 5/2023 |
| WO | 2023090112 A1 | 5/2023 |
| WO | 2023090706 A1 | 5/2023 |
| WO | 2023094389 A1 | 6/2023 |

OTHER PUBLICATIONS

International Search Report for Application No. PCT/US2023/076015; mailed Mar. 12, 2024; 4 pp.

International Search Report for Application No. PCT/US2024/020186; mailed Jun. 27, 2024; 3 pp.

International Search Report for Application No. PCT/US2023/016452; mailed Jun. 13, 2023; 3 pp.

International Search Report for Application No. PCT/US2023/074116; mailed Jan. 18, 2024; 5 pp.

International Search Report for Application No. PCT/US2023/066406; mailed Aug. 21, 2023; 5 pp.

* cited by examiner

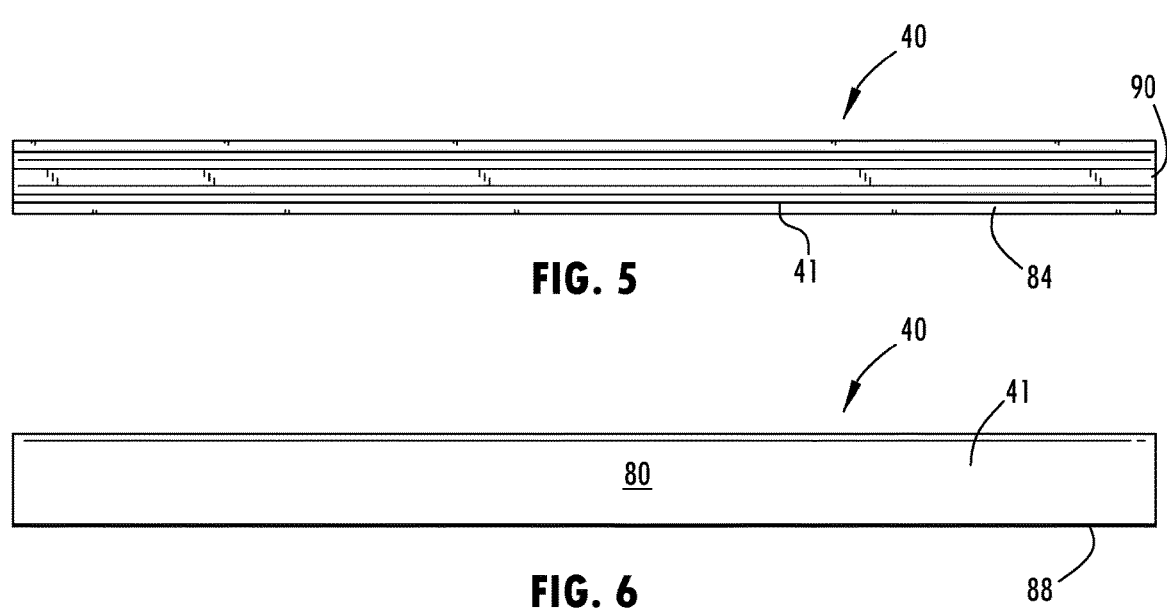
FIG. 5
FIG. 6
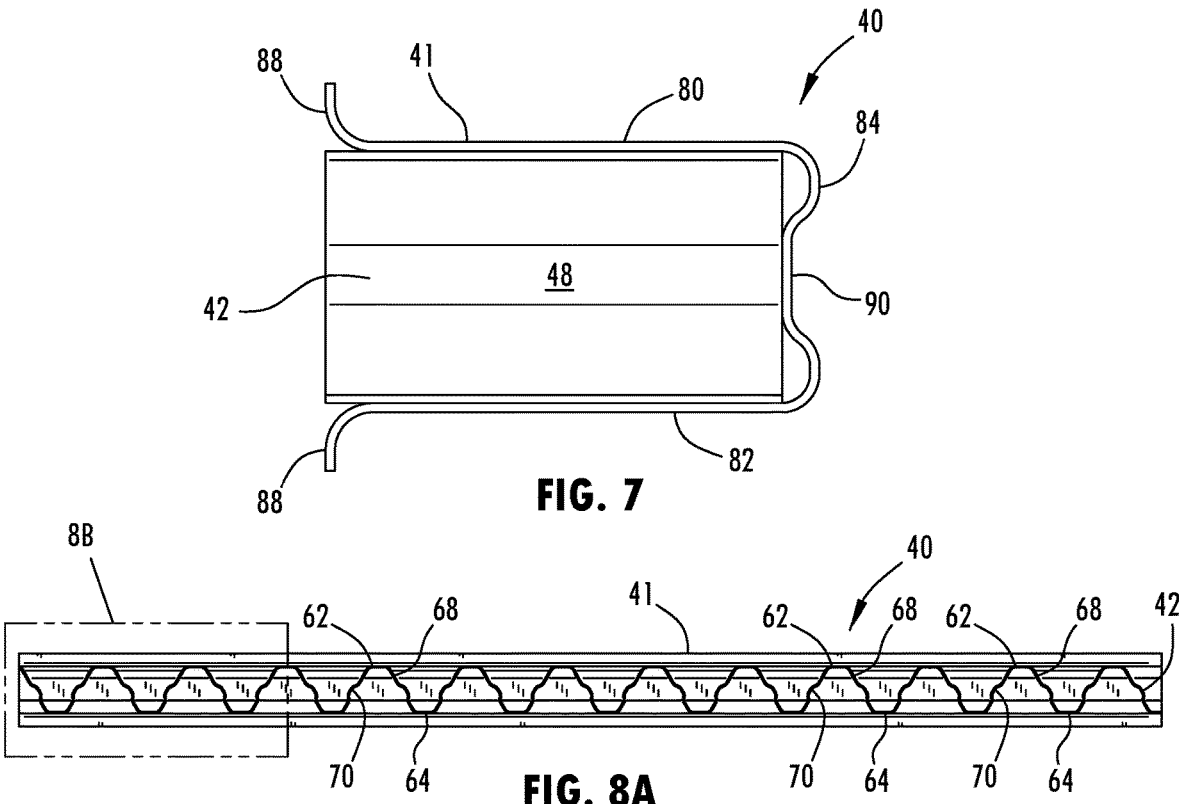
FIG. 7
FIG. 8A

VEHICLE BEAM ASSEMBLY WITH COORDINATED STIFFENING MEMBERS

CROSS-REFERENCE TO RELATED APPLICATION

This application claims benefit and priority under 35 U.S.C. § 119(e) to U.S. Provisional Patent Application No. 63/363,785, filed Apr. 28, 2022, the disclosure of which is considered part of this application and is hereby incorporated by reference in its entirety.

TECHNICAL FIELD

The present disclosure relates to structural members and beams, and more particularly relates to vehicle components, such as for use as structural and reinforcement beams on rocker assembles, battery trays, and other vehicle frame structures.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Side impacts to a vehicle are commonly tested with side pole impact testing, which direct significant side impact forces to the vehicle. Vehicle frames primarily absorb these side impacts at rocker sections that run longitudinally between the front and rear wheels along the lower outboard portions of the vehicle frame.

With the incorporation of battery trays in electric and hybrid electric vehicles in the lateral inboard area between opposing rocker sections, it is desirable for the side impact forces to be directed away from the battery tray and towards a vehicle floor cross member. For example, it is generally known to increase stiffness of a vehicle sill assembly, such as by adding a rocker insert within the vehicle sill assembly.

SUMMARY

The disclosure provides a vehicle structural component, such as a rocker component, that includes a beam assembly with at least two stiffening members attached together to provide the component with high bending strength and crush resistance. In some examples, the beam assembly may be a vehicle rocker assembly that includes a stiffening member disposed within the hollow interior of a rocker assembly. The stiffening member has a top wall, a bottom wall, and a side wall, such as to form a C-shape cross-section. The rocker assembly also includes a second stiffening member that has a plurality of wall sections that each include an upper portion engaged with the top wall of the first stiffening member and a lower portion engaged with the bottom wall of the first stiffening member at a location spaced along the length of the rocker assembly from the upper portion. The two stiffening member function cooperatively in side impact energy management, such as by having the top and bottom walls of the first stiffening member supported in generally planar parallel alignment by the second stiffening member when undergoing the inboard lateral impact force to increase lateral bending strength of the rocker insert. The plurality of wall sections of the second stiffening member are also configured to align with the lateral impact load to provide high crush resistance and stiffness to the rocker section. The combined properties of the cooperative stiffening members provide enhanced resistance to intrusion as a result of side impact along the length of the rocker assembly.

According to one aspect of the disclosure, a vehicle rocker assembly includes one or more of a sill outer or a sill inner to define an elongated hollow interior. The vehicle rocker assembly also includes a rocker insert disposed within the hollow interior. The rocker insert includes a first stiffening member having a top wall, a bottom wall, and a side wall. The rocker insert also includes a second stiffening member including a plurality of wall sections that each include an upper portion engaged with the top wall and a lower portion engaged with the bottom wall at a location spaced along the length of the rocker insert from the upper portion. The top and bottom walls of the first stiffening member are configured to be supported by the second stiffening member when undergoing the inboard lateral impact force to increase lateral bending strength of the rocker insert.

According to another aspect of the disclosure, a rocker insert is provided that is configured to be disposed within an elongated hollow interior defined by one or more of an inboard wall portion of a sill inner and an outboard wall portion of a sill outer. The rocker insert includes a first stiffening member having a top wall, a bottom wall, and a side wall. The rocker insert also includes a second stiffening member including a plurality of wall sections that each include an upper portion engaged with the top wall and a lower portion engaged with the bottom wall at a location spaced along the length of the rocker insert from the upper portion. The top and bottom walls of the first stiffening member are configured to be supported by the second stiffening member when undergoing the inboard lateral impact force to increase lateral bending strength of the rocker insert.

Implementations of the disclosure may include one or more of the following optional features. In some examples, the upper portion of each of the plurality of wall sections engages at a first location along a length of the rocker insert and the lower portion engaged a second location along the length of the rocker insert, wherein a distance between the first and second locations is substantially the same for each of the plurality of wall sections along the rocker insert.

In some examples, top wall includes a flange portion extending at an angle from a remainder of the top wall.

In some examples, the bottom wall includes a flange portion extending at an angle from a remainder of the bottom wall.

In some examples, the top wall includes a flange portion extending at an angle from a remainder of the top wall and the bottom wall includes a flange portion extending at an angle from a remainder of the bottom wall.

In some examples, the flange portion of the top wall extends at an angle of approximately 80-100 degrees from the remainder of the top wall.

In some examples, the flange portion of the bottom wall extends at an angle of approximately 80-100 degrees from the remainder of the bottom wall.

In some examples, one or more of the flange portion of the top wall and the flange portion of the bottom wall are configured to be coupled to the sill outer, in replacement of a traditional sill inner.

In some examples, one or more of the flange portion of the top wall and the flange portion of the bottom wall are configured to be coupled to the sill inner, in replacement of a traditional sill outer.

In some examples, the side wall includes a recessed portion.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

FIG. 5 is a side view of the rocker insert shown in FIG. 4;

FIG. 6 is a top view of the rocker insert shown in FIG. 4;

FIG. 7 is an end view of the rocker insert shown in FIG. 4;

FIG. 8A is an opposite side view of the rocker insert shown in FIG. 4;

Like reference numerals indicate like parts throughout the drawings.

DETAILED DESCRIPTION

Figure 1:
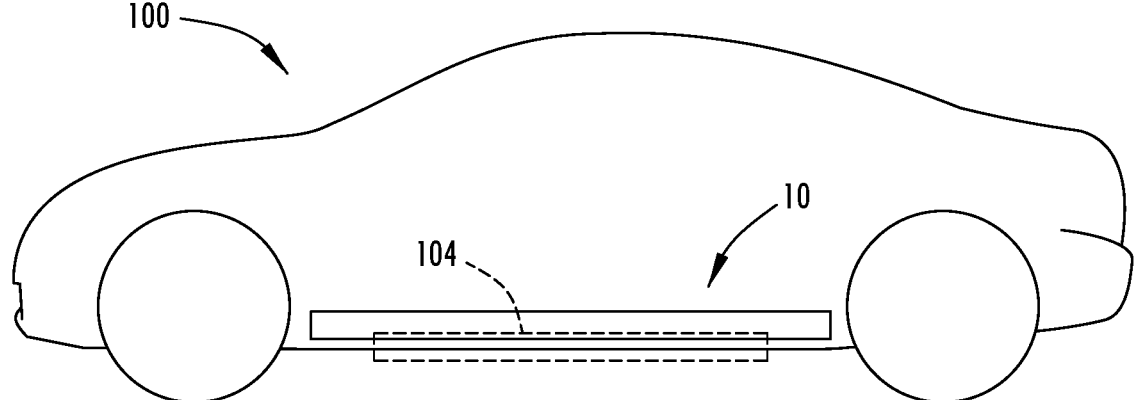
FIG. 1 is an side elevation view of a vehicle schematically showing a rocker assembly and a battery tray enclosure.
Figure 2:
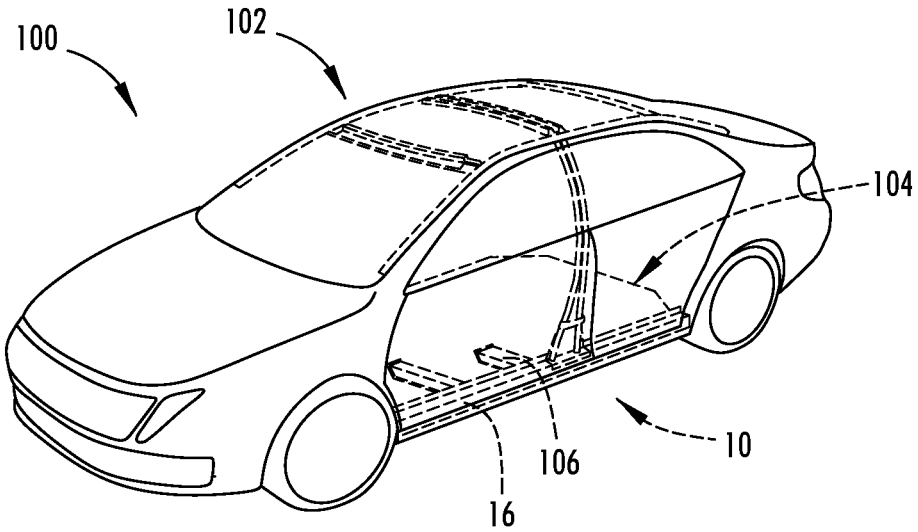
FIG. 2 is a perspective view of a vehicle schematically showing a rocker assembly and other structural components.

Referring now to the drawings and the illustrative embodiments depicted therein, a beam component is provided for a vehicle 100, such as for a body structure or frame 102 as shown in FIGS. 1 and 2. The vehicle frame 102 and associated components may have various designs and configurations, such as for different styles and types of vehicles. As shown for example in FIGS. 1 and 2, the vehicle frame 102 has various structural components, including a B-pillar, a hinge pillar, a floor cross-member 106, a roof bow, and a header, among other structural components that support the body of the vehicle and protect passengers, engine components, and sensitive electronics from damage when undergoing collisions. In some examples, the vehicle 100 may be operated by a propulsion system that uses a battery, such as a battery or battery modules that may be supported in a battery tray 104 generally located between the axles and below the floor 108 to distribute the battery weight and establish a low center of gravity for the vehicle.

Figures 3, 4:
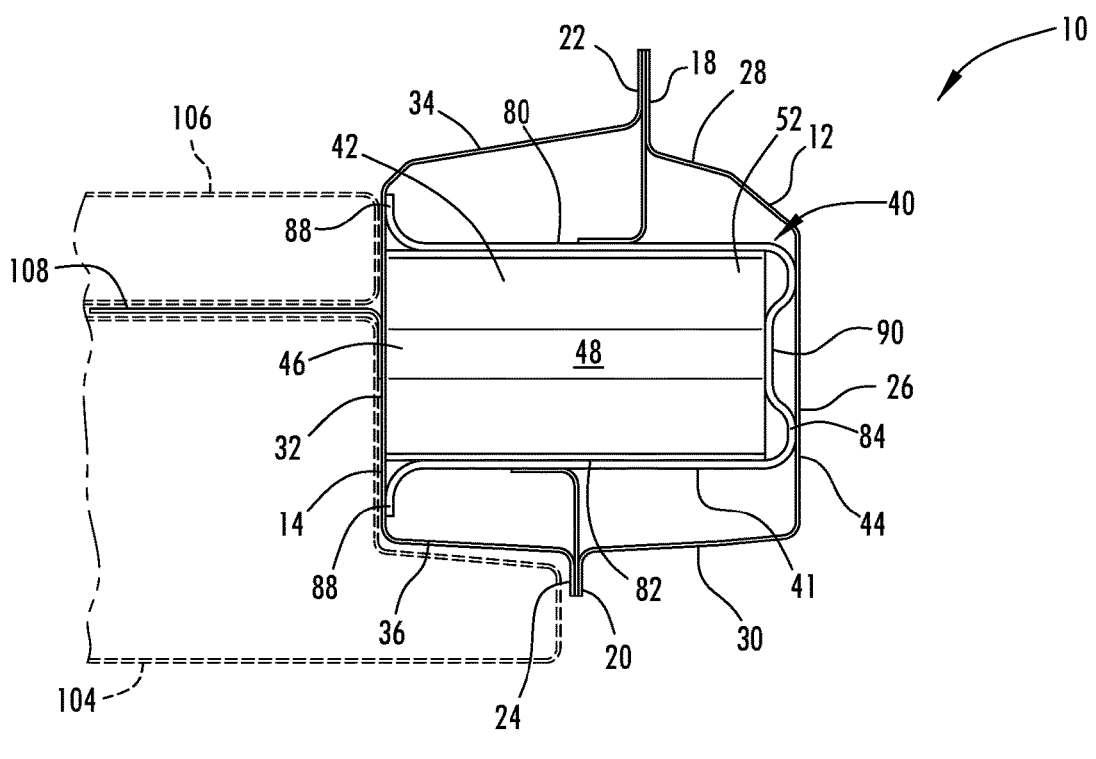
FIG. 3 is a cross-sectional view of an example of a vehicle rocker assembly including a rocker insert.
FIG. 4 is a perspective view of the rocker insert shown in FIG. 3.
Figures 8B, 9A, 9B:
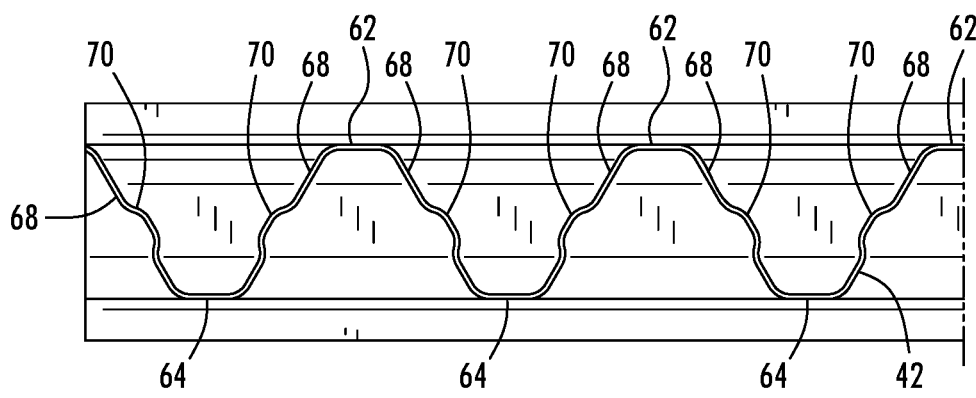
FIG. 8B is an enlarged view of the section indicated in FIG. 8A.
FIG. 9A is a perspective view of a second stiffening member of the rocker insert shown in FIG. 4.
FIG. 9B is an enlarged view of the section indicated in FIG. 9A.

The beam component disclosed herein may be a rocker insert, a B-pillar, or a battery tray side member or another structural component that would benefit from the impact energy management properties provided and disclosed herein. The vehicle rocker component includes a sill panel or panels, such as a sill inner panel 12 and sill outer panel 14 that attach together around an interior area 16, where the terms "inner" and "outer" are made in reference to inboard or inward facing and outboard or outward facing directions on the vehicle, such oriented in FIG. 1. As shown in FIGS. 2 and 3, the example of the vehicle rocker assembly 10 is provided with a reinforcement insert disposed in the interior area 16 to form a multi-tubular rocker structure. The rocker assembly 10 shown in FIG. 2 is disposed alongside an outer section of a battery tray 104 with the floor cross-member 106 being attached to the vehicle rocker assembly 10 so as to span laterally over the battery tray 104. Accordingly, the vehicle component in additional implementations may also or alternatively be provided as a battery tray frame component, such as a longitudinally oriented side wall section of the battery tray.

When designing the vehicle rocker assembly with a rocker insert disclosed herein, the outer dimensions of the vehicle rocker assembly may be reduced and the overall weight of the vehicle rocker assembly may be reduced while meeting the required impact and loading conditions. The rocker insert may span a partial section of the vehicle rocker assembly or the entire length of the rocker assembly, such as to extend beyond the rocker assembly into and to also reinforce an adjacent component. The rocker insert disclosed herein may comprise the entire vehicle component or may be joined to additional reinforcements or parts of the vehicle component, such as at desired sections of the vehicle component. Further, in some examples the rocker assembly may be embodied as a subassembly or as part of a corresponding vehicle component, such as a structural component or a battery tray component and as such may be designed to undergo various impact forces and to support and sustain different loading conditions.

Figure 28:
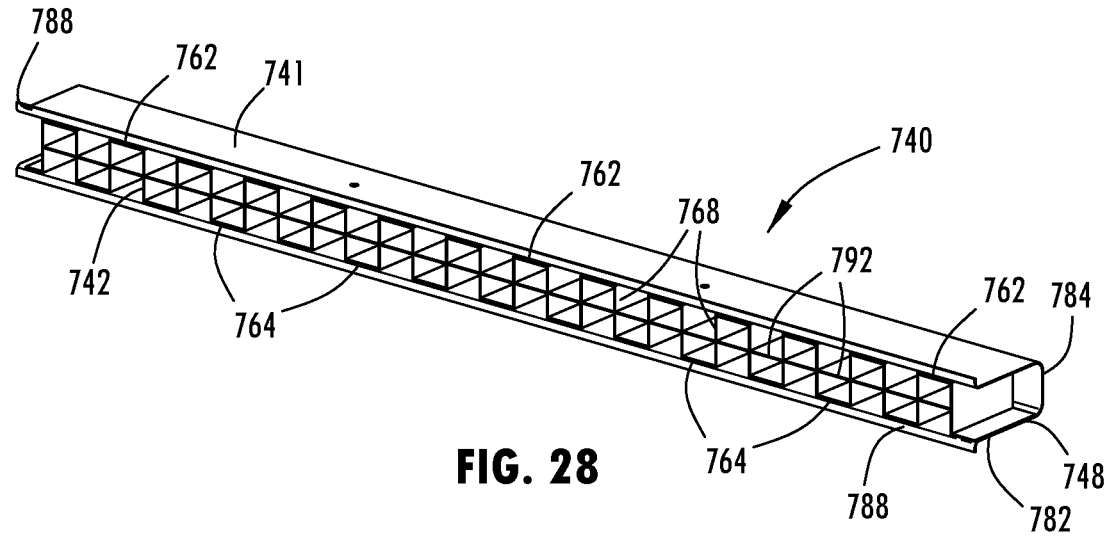
FIG. 28 is a perspective view of another example of the rocker insert.

Moreover, the rocker insert disclosed herein may be formed with one or more pieces of sheet material, such as by roll forming a metal sheet, to provide the structure with a relatively high strength (for shear and axial loading) and low weight in comparison to common rocker panels, such as to allow the sill panels of the corresponding vehicle component (if provided) to use less material, occupy a smaller packaging space, and have greater flexibility in the outer shape design. The cross-sectional shape of different examples of the vehicle component and rocker insert may include various shapes and thicknesses for the desired application of the vehicle component. In addition, some implementations of the rocker insert may include an aluminum extrusion that is assembled with a metal sheet material, such as shown in FIG. 28.

Unless specified to the contrary, it is generally understood that additional implementations of the rocker component may have an opposite orientation from the examples shown and described, such as where the sill panels identified as an inner panel may be used as the outer panel and the sill panels identified as an outer panel may be used as the inner panel. The cross-sectional shape of the inner and outer panels may vary along the rocker, such as, for example, by flaring outward at the ends.

Referring now to the vehicle rocker assembly 10 shown in FIG. 3, a first sill panel 12 and a second sill panel 14 are attached together to surround a hollow interior space 16 between the sill panels 12, 14. The vehicle rocker assembly 10 shown in FIG. 3 is embodied as a vehicle rocker component. Accordingly, the first sill panel 12 may be referred to as a sill inner panel of a rocker component. The first sill panel 12 has an upper flange 18 and a lower flange 20 that extend along respective upper and lower edges of the inner panel. The first sill panel 12 protrudes inboard from the upper and lower flanges 18, 20 to form outward facing concave structures. The second sill panel 14, which may be referred to as a sill outer panel of a rocker component, has a C-shaped cross section with flanges 22, 24, which may similarly be referred to as an upper flange 22 and a lower flange 24. The upper flanges 18, 22 and the lower flanges 20, 24 of the inner and outer sill panels 12, 14 are attached together, such as via welding, with the concave structures facing each other. The upper and lower flanges 18, 20, 22, 24 of each of the sill panels 12, 14 shown in FIG. 3 extend longitudinally, continuously along the edges of the rocker component; however, it is contemplated that the flanges may be trimmed away in select areas to facilitate frame attachment or to reduce weight.

As further shown in FIG. 3, the inner and outer sill panels 12, 14 are joined together to define a hollow interior space 16 between the sill panels 12, 14. The upper and lower flanges 18, 20, 22, 24 are substantially planar and oriented in a generally vertical configuration, such as to mate in generally continuous contact along the length of the component. The upper and lower flanges 18, 20, 22, 24 may be joined together via welding, and preferably spot welding, although it is conceivable that alternative welding methods or joining means may be used in addition or in the alternative to spot welding in different implementations of a rocker component, such as adhesive or fasteners or the like.

The first sill panel 12, or inner panel of the vehicle rocker assembly 10, has an inner wall 26 or inboard wall portion that is substantially planar. The inner wall 26 integrally interconnects with a corner transition to an upper wall 28 and a lower wall 30 at the respective upper and lower ends. The corner transitions are approximately 90 degrees between the inner wall 26 and the upper and lower walls 28, 30. Also, the corner transitions are defined by the longitudinal bends to a sheet material that forms the first sill panel 12, such as a metal sheet (e.g., an advanced high strength steel sheet or aluminum sheet). Similarly, the upper and lower walls 28, 30 each have a corner transition of approximately 90 degrees to the upper flange 18 and the lower flange 20, respectively. The corner transitions are also defined by longitudinal bends in the sheet material of the first sill panel 12, such as formed by a roll form process. As also shown in FIG. 3, the upper and lower flanges 18, 20 are substantially planar and oriented in parallel alignment with the planar extent of the inner wall 26. The upper and lower walls 28, 30 of the first sill panel 12 are also substantially planar and, as shown in FIG. 3, are substantially parallel to each other, although in additional examples they may be slightly angled from each other. The corner transitions may also have an angular transition greater or less than shown in FIG. 3, such as approximately between 40 and 120 degrees, between 70 and 100 degrees, between 80 and 95 degrees, or between 82 and 92 degrees.

As also shown in FIG. 3, the second sill panel 14 or outer panel of the vehicle rocker assembly 10 has an outer wall 32 or outboard wall portion that is substantially planar and integrally interconnects with an upper wall 34 and a lower wall 36 at its respective upper and lower ends. The corner transitions of approximately 80 degrees between the outer wall 32 and the upper and lower walls 34, 36 are defined by longitudinal bends to a sheet material that forms the second sill panel 14. The sheet material may be the same or different from the first sill panel 12 and may include a metal sheet, such as an advanced high strength steel sheet or aluminum sheet. Similarly, the upper wall 34 also has a corner transition to the upper flange 22 and the lower wall 36 has a corner transition to the lower flange 24, which are each also defined by longitudinal bends in the sheet material of the second sill panel 14. Again, the corner transitions between the upper and lower walls 34, 36 and the upper and lower flanges 22, 24 and the outer wall 32 may have an angular transition greater or less than shown in FIG. 4, such as approximately between 40 and 120 degrees, between 70 and 100 degrees, between 80 and 95 degrees, or between 82 and 92 degrees.

As shown in FIG. 3, the upper and lower flanges 22, 24 are substantially planar and oriented in parallel alignment with the planar extent of the outer wall 32. The upper and lower walls 34, 36 of the second sill panel 14 are also substantially planar, but are slightly angled from being orthogonal to the outer wall 32 and flanges 22, 24. With the flanges 18, 20, 22, 24 of the panels 12, 14 attached together, the walls thereof define a substantially hexagonal cross-sectional shape; however, it is appreciated that additional examples of the rocker insert may have various alternative cross-sectional shapes (e.g., a substantially rectangular shape) and different wall configurations for the corresponding vehicle design (e.g., portions of the inner or outer walls that are not vertically oriented). It is also contemplated that in other examples the outer sill and the inner sill may each include a different configuration including but not limited to the outer sill having an inward or outward protruding stiffening rib portion configured to provide additional stiffness and side impact support.

As further shown in FIGS. 3 and 4, the vehicle rocker assembly 10 includes a rocker insert 40 disposed within the elongated hollow interior 16. The rocker assembly 10 includes a first stiffening member 41 which includes a top wall 80, a bottom wall 82, and a first side wall 84. In the example shown in FIGS. 3 and 4, the first stiffening member includes the top wall 80, the bottom wall 82 disposed generally parallel to the top wall 80, and a first side wall 84 which integrally extends between the top wall 80 and the bottom wall 82. As a result, the cross section of the first stiffening member includes a C-shape. The top wall 80, the bottom wall 82, and the side wall 84 define a channel along the length of the rocker insert. In one example, the top wall 80 and the bottom wall 82 have a width which extends at least 50% of the width between the outer sill 14 and the inner sill 12. In other examples, the top wall 80 and the bottom wall 82 have a width which extends more than 50% of the width between the outer sill 14 and the inner sill 12.

In one example, the top wall 80 and the bottom wall 82 are generally flat parallel extending surfaces, however various other implementations have been contemplated including corrugation disposed on one or more of the top wall 80 and the bottom wall 82. In the example shown, the top wall 80 and the bottom both have flange portions 88 which extend at an angle from the top wall 80 and the bottom wall 82. The angle between the flange and the top or bottom wall 82 may be approximately ninety degrees, however, various other angles have been contemplated including but not limited to angles in the range of 25-125 degrees, angles in the range of 35-115 degrees, angles in the range of 45-105 degrees, angles in the range of 60-100 degrees, angles in the range of 80-100 degrees, and angles in the range of 85-95 degrees.

The flange portions 88 are configured to allow the rocker insert 40 to be coupled to another vehicle component such as a sill inner, a sill outer, or other vehicle component. In one example one or more of the flange portion of the top wall and the flange portion of the bottom wall are coupled to a sill inner. For example, the rocker insert may replace a traditional sill outer such that a separate sill outer is not needed. In another example, one or more of the flange portion on the top wall and the flange portion of the bottom wall are coupled to a sill outer. In this case, the rocker insert may replace a traditional sill inner such that a separate sill inner is not needed. In one example, the coupling between the flange portion/portions and the sill inner or sill outer is direct coupling done through welding. However, various other configurations have been contemplated including but not limited to indirect coupling such that another component is disposed between the flange portion(s) and the sill inner or sill outer.

Moreover, in the example shown, the side wall 84 curves outward from both the top wall 80 and the bottom wall 82 before curving back inwards, towards the channel, and meeting at a recessed portion 90. In some examples, the recessed portion 90 is curved such that it has a generally u-shape that forms a stiffening channel along the side wall 84. The depth and extent of the stiffening channel may be altered based on desires for the formation, sheet material hardness, ductility, and thickness, among other considerations. In additional examples, additional stiffening channels may be formed on the side wall or stiffening channels may be omitted or otherwise differently shaped. In some examples, one or more of the top wall 80 or the bottom wall 82 may include cut-outs to accommodate other vehicle components without departing from the spirit of the invention.

Referring still to the example shown in FIGS. 3 and 4, it is contemplated that one of the side wall and or the flange portions 88 of the top and bottom wall 82 may be coupled to one of the inner sill or the outer sill to support the rocker insert 40 in the elongated hollow interior 16. Again, this coupling may be through welding, however, other coupling methods have been contemplated including but not limited to the use of fasteners or adhesive. In one example, the side wall is coupled to the inner sill. In another example, the side wall is coupled to the outer sill. In another example, the flange portions 88 of the top and/or bottom wall 82 are coupled to the outer sill. In another example, the flange portions 88 of the top and/or bottom wall 82 are coupled to the inner sill.

Referring still to the example shown in FIGS. 3 and 4, the rocker insert 40 also includes a second stiffening member 42. The second stiffening member 42 is disposed at least partially within the channel formed by the top wall 80, the bottom wall 82, and the side wall 84 of the first stiffening member 41. The stiffening member 42 includes at least one wall portion 46 defining a fore edge 48, an aft edge 50, a first side edge 52 and a second side edge 54 opposite the first side edge 52. The first and second side edges 52, 54 are disposed parallel to one another along a length of the rocker insert 40. In one example, the fore edge 48 and the aft edge 50 are disposed at different locations along the length of the rocker insert 40. The second stiffening member 42 may be disposed along the entire length of the rocker insert 40 or in additional examples a portion of the length of the rocker insert 40, such as more than 50% of the length of the rocker insert or more than 80% or the length of the rocker insert. In addition, the second stiffening member 42 may be a single piece or segmented into multiple pieces that are attached in the channel of the first stiffening member of the rocker insert, which may also be a single piece or multiple segmented pieces.

In one example, the at least one wall portion 46 is formed from a flat sheet, typically coiled steel or aluminum, which is then cut and/or roll-formed or otherwise bent into the desired shape. It is also contemplated that the at least one wall portion 46 may be comprised of another material having the desired strength requirements and/or from non-coiled steel or aluminum. It is also contemplated that the at least one wall portion 46 in formed by another method.

In some examples, the stiffening member 42 includes a plurality of wall portions 46 coupled to one another in a longitudinal vehicle direction, each defining a fore edge 48, an aft edge 50, a first side edge 52, and a second side edge 54 opposite the first side edge 52. Moreover, the fore edge 48 and the aft edge 50 of each of the plurality of wall portions 46 are disposed at different locations along the length of the rocker insert 40. Additionally, the second stiffening portion 42 includes a second wall portion 46 defining a fore edge 48, an aft edge 50, a first side edge 52 and a second side edge 54 opposite the first side edge 52 coupled to the first wall portion 46 such that the fore edge 48 and the aft edge 50 of the second wall portion 46 are disposed in the same fore and aft location as the fore edge 48 and the aft edge 50 of the second wall portion 46. In one example, the upper wall portion 62 of the first wall portion 46 is coupled to the lower wall portion 64 of a second wall portion 46, however, various other configurations have been contemplated. In one example the first wall portion 46 and the second wall portion 46 are coupled by welding however, various other coupling methods have been contemplated including but not limited to the use of fasteners and/or adhesive. In one example, the upper wall portion 62 of each of the plurality of wall sections engages at a first location along the length of the rocker insert and the lower wall portion 64 engages a second location along the length of the rocker insert 40. In some examples, a distance between the first and second locations is substantially the same for each of the plurality of wall sections along the rocker insert 40. In other examples, the distance between the first and second locations is variable for each of the plurality of wall sections along the rocker insert 40.

Referring still to the example shown in FIGS. 3 and 4, a cross-sectional shape of the second stiffening portion 42 comprises a general wave shape with a series of upper wall portions extending in parallel with each other. The second stiffening portion 42 includes an upper wall portion 62 defined as including highest point of the second stiffening portion 42 and a lower wall portion 64 defined as a lowest point of the second stiffening member 42. The plurality of wall sections of the second stiffening member 42 extend substantially orthogonal or substantially orthogonal to the side wall 86 of the first stiffening member 41 to align or substantially align with an inboard lateral impact force to the vehicle. In other words, the plurality of wall sections extend generally perpendicularly from the side wall 86 to the remainder of the channel along a width of the top wall 80 and bottom wall 82 of the first stiffening member 41.

In one example, the upper wall portion 62 of the second stiffening portion 42 extends between the first side edge 52 and the second side edge 54 and is configured to carry a load path laterally between the inboard and outboard wall portions. In other words, the upper wall portion 62 of the second stiffening portion 42 extends at least partially between the sill inner and the sill outer, if included. As shown in the example illustrated in FIGS. 3 and 4, the lower wall portion 64 of the second stiffening portion 42 also extends between the first side edge 52 and the second side edge 54 and is configured to carry a load path laterally between the inboard and outboard wall portions.

The lateral vehicle direction generally extends across the width dimension of the vehicle. In contrast, the longitudinal vehicle direction generally extends along the length dimension of the vehicle. In some examples, the upper wall portion 62 may be disposed in a generally horizontal plane. The upper wall portions 62 of the second stiffening portion 42 are configured to be oriented to generally align with anticipated lateral impacts to the side of a vehicle, so as to provide increased stiffness to the corresponding portion of the upper or lower wall of the rocker insert 40. Moreover, the upper wall portion 62 of the second stiffening portion 42 extends at least partially between the sill wall portions of the sill inner 12 and the sill outer 14. In some examples the second stiffening portion 42 may be across an entire surface or may be disposed on only a portion of the surface. The upper wall portions 62 and the lower wall portions 64 may be of any shape and side as desired, including but not limited to the upper wall portion 62 being a v-shape or a u-shape and/or the lower wall portion 64 being a v-shape or a u-shape. It is also contemplated that the upper wall portion 62 and the lower wall portion 64 may be the same shape or may be different shapes than one another. Moreover, it is contemplated that the upper wall portions 62 and/or the lower wall portions 64 may be a single repeating shape, may be alternating shapes, or any pattern or other contemplated disposition of wall shapes.

In some examples, a height of the upper wall portion 62 is the same as the depth of the lowest point on the lower wall portion 64. However, it is also contemplated that the height of the upper wall portion 62 and the depth of the lowest point on the lower wall portion 64 may be different than one another such that the height of the upper wall portion 62 is larger than the depth of the lower wall portion 64 or vice versa. Additionally, it is contemplated that the heights of the upper wall portions 62 may remain constant along the second stiffening member 42. However, it is also contemplated that the height of the upper wall portions 62 may be variable along the second stiffening member 42. Similarly, it is contemplated that the depth of the lower wall portion 64 may remain constant along the second stiffening member 42. However, it is also contemplated that the depth of the lower wall portion 64 may be variable along the second stiffening member 42.

In some examples, a width of the upper wall portion 62 is the same width as the lower wall portion 64. However, it is also contemplated that the width of the upper wall portion 62, measured from a center of one lower wall portion 64 to the center of an adjacent lower wall portion 64, and the width of the lower wall portion 64, measured from one upper wall portion 62 to another upper wall portion 62, may be different than one another such that the width of the upper wall portion 62 is larger than the width of the lower wall portion 64 or such that the width of the lower wall portion 64 is larger than the width of the upper wall portion 62. Moreover, it is contemplated that the width of the upper wall portions 62 may remain constant along the length of the second stiffening member 42. However, it is also contemplated that the width of the upper wall portion 62 may be variable along the second stiffening member 42. Similarly, it is contemplated that the width of the lower wall portions 64 remain constant along the length of the second stiffening member 42. However, it is also contemplated that the width of the lower wall portion 64 may be variable along the second stiffening member 42.

In some examples, the lower wall portion 64 has a width of approximately 0.5-1.5 mm. In other examples the lower wall portion 64 has a width of approximately 0.8-1.3 mm. In yet another example, the lower wall portion 64 has a width of approximately 0.9-1.1 mm. In one example, the lower wall portion 64 has a width of approximately 0.9 mm. In another example, the lower wall portion 64 has a width of approximately 1.1 mm. However, various other lower wall portion 64 widths have been contemplated.

In some examples, the plurality of wall portions 46 are spaced apart from one another by 100 mm or less. In other examples, the plurality of wall portions 46 are spaced apart from one another by 75 mm or less. In other examples, the plurality of wall portions 46 are spaced apart from one another by 50 mm or less.

In the example shown in FIGS. 3 and 4, the cross-sectional shape begins at the upper wall portion 62 which is a generally flat surface. The second stiffening member 42 then turns into an angled portion 68 which extends downwards at an angle before reaching the lower wall portion 64 which is another generally flat surface. Another angled portion 68 extends from the flat surface of the lower wall portion 64 upwards towards a second upper wall portion 62. In the examples shown, the angled portion 68 extends at approximately a 45 degree angle however other angles have been completed from 15-105 degrees. The angled portion 68 provides a shape such that a distance between a first lower wall portion 64 and a second lower wall portion 64 is larger than a length of the upper wall portion 62. Similarly, the distance between a first upper wall portion 62 and a second upper wall portion 62 is larger than a length of the lower wall portion. As shown in the example illustrated in FIGS. 3 and 4, this shape is then repeated in a pattern throughout the length. However, various other shapes have been contemplated. Additionally, the angled portion 68 between lower wall portion 64 and upper wall portion 62 may include one or more reinforcement ribs 70 which are configured to provide additional strength to the second stiffening member 42. In the example shown, the transitions between the angled portion 68 and the upper wall portion 62/lower wall portion 64 and near the reinforcement rib 70 are curved angles, however, various other configurations have been contemplated including more sharp angled transitions.

It is also contemplated, as described above, that the upper wall portion 62 and lower wall portion 64 of the second stiffening member 42 may be coupled to the top and bottom walls 80, 82, respectively. Typically, this coupling is joined by welding, however, other processes have been contemplated including but not limited to fasteners or adhesive. The top and bottom walls 80, 82 of the first stiffening member 41 are configured to be supported by the second stiffening member 42 when undergoing the inboard lateral impact force to increase lateral bending strength of the rocker insert. In other words, the integration of the first stiffening member 41 with the second stiffening member 42, in the configuration as described, provides a cooperative structural effect that increases lateral bending strength of the rocker insert 40 leading to a lower failure risk or buckling threshold of the rocker insert during the lateral impact force, which may in turn increase the battery package space, resulting vehicle range, and overall safety of the vehicle.

Figure 10:
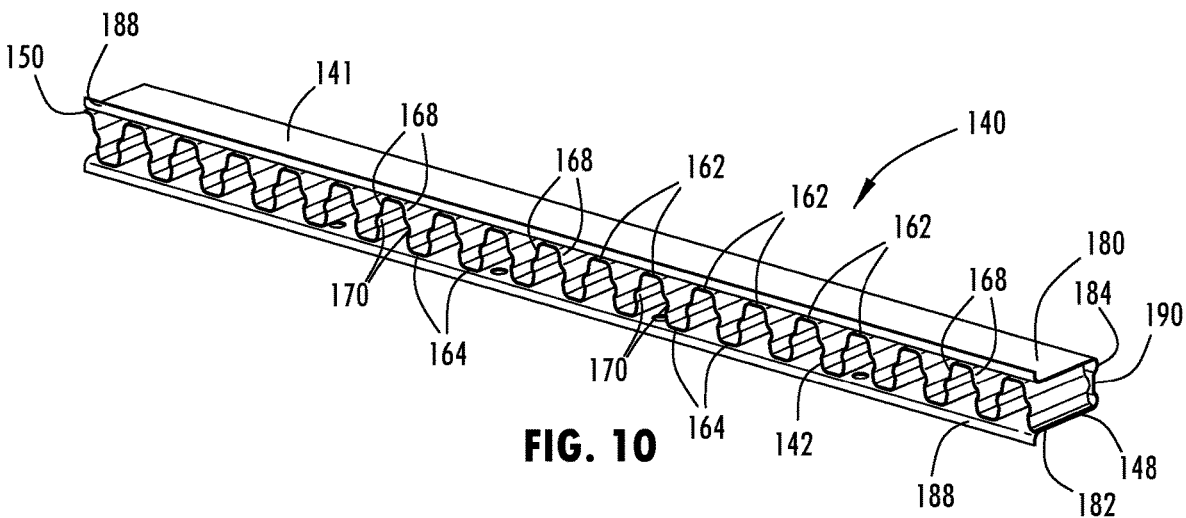
FIG. 10 is a perspective view of another example of the rocker insert.
Figure 11:
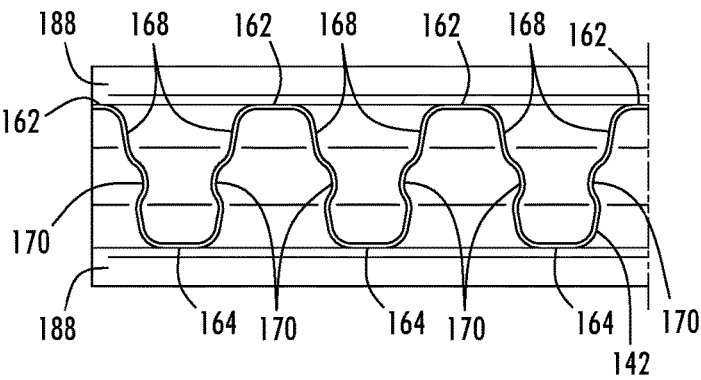
FIG. 11 is an enlarged side view of the rocker insert shown in FIG. 10.
Figure 12:
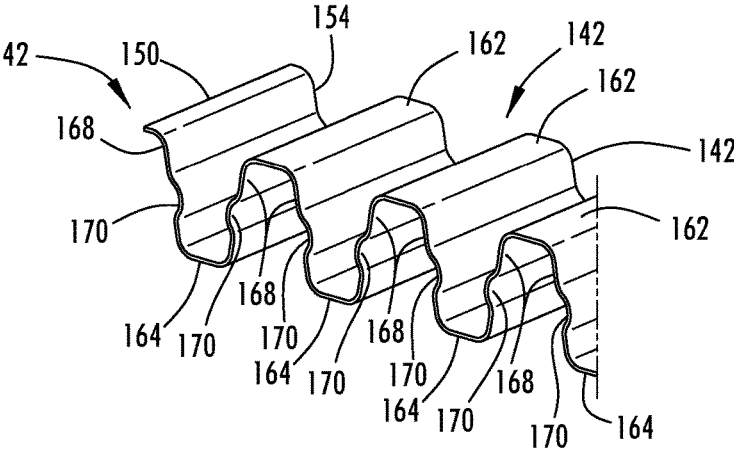
FIG. 12 is an enlarged perspective view of the second stiffening member of the rocker insert shown in FIG. 10.

Referring now to the example shown in FIGS. 10-12, the rocker assembly 110 includes similar features to the features described above with respect to the rocker assembly 10 shown in FIGS. 1-9B, including but not limited to the sill outer, the sill inner, and the rocker insert 140 disposed within the elongated interior of the sill structure. The rocker insert 140 similarly includes a first stiffening member 141 defining a top wall 180, a bottom wall 182, and a side wall 184 integrally connecting between the top and bottom walls along with the rocker insert 140. The rocker insert 140 also similarly includes a second stiffening member 142 including the wall portion 146 with the fore edge 148 and the aft edge 150 disposed at different locations along the length of the rocker insert 140. However, as illustrated in the example shown in FIGS. 10-12, the angled portions 168 of the second stiffening member 142 extend at a smaller degreed angle than the example shown in FIGS. 1-9B. More specifically, the angled portions 168 of the second stiffening member 142 extend at an angle slightly greater than 90 degrees, for example in the 95-105 degree range, such that the distance between the first upper wall portion 162 and the second upper wall portion 162 is only slightly larger than the width of the lower wall portion 164. Similarly, as shown in FIG.

11, the distance between the first lower wall portion 164 and the second lower wall portion 164 is only slightly larger than the width of the upper wall portion 162.

Figure 13:
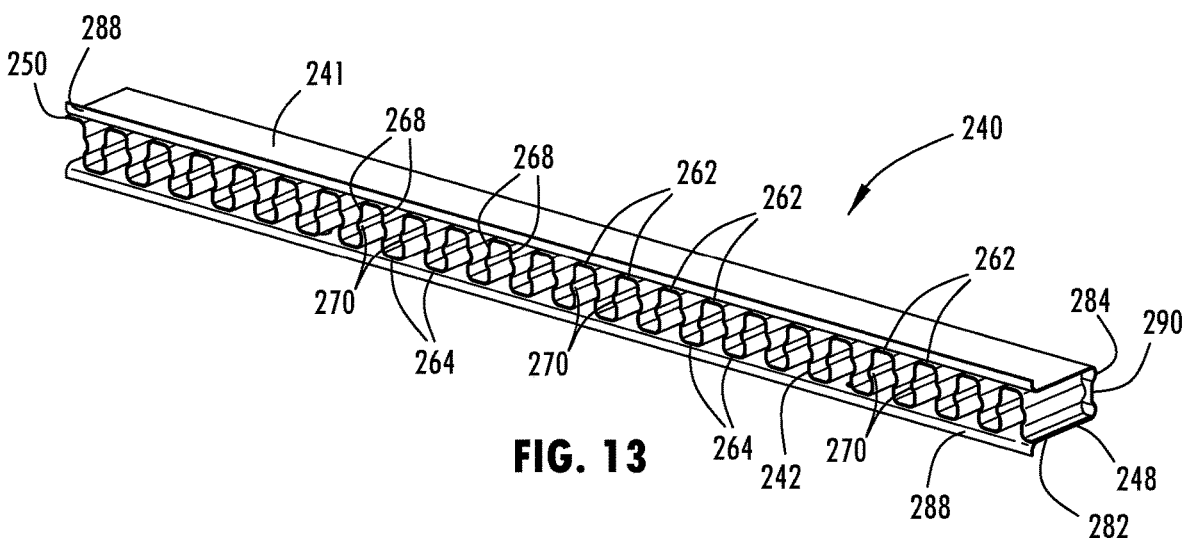
FIG. 13 is a perspective view of another example of the rocker insert.
Figure 14:
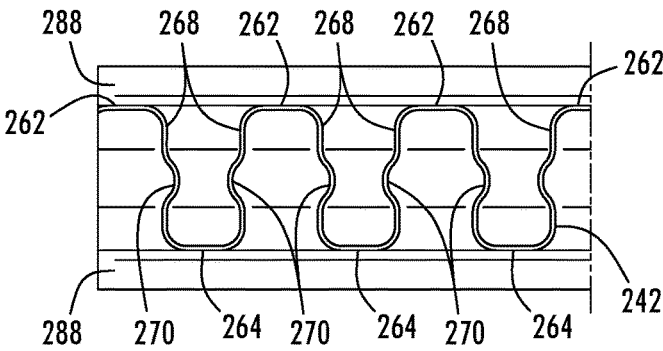
FIG. 14 is an enlarged side view of the rocker insert shown in FIG. 13.
Figure 15:
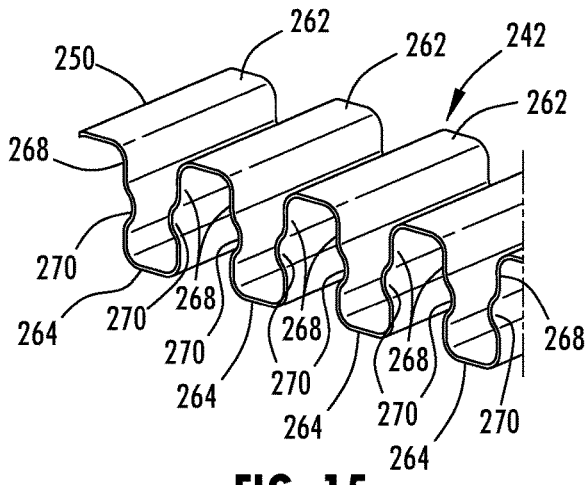
FIG. 15 is an enlarged perspective view of the second stiffening member of the rocker insert shown in FIG. 13.

Referring to the example shown in FIGS. 13-15, the rocker assembly 210 includes similar features to the features described above with respect to the rocker assembly 10 shown in FIGS. 1-9B, including but not limited to the sill outer, the sill inner, and the rocker insert 240 disposed within the elongated interior of the sill structure. The rocker insert 240 similarly includes a first stiffening member 241 defining a top wall 280, a bottom wall 282, and a side wall 284 integrally connecting between the top and bottom walls along with the rocker insert 240. The rocker insert 240 also similarly includes a second stiffening member 242 that includes the wall portion 246 with the fore edge 248 and the aft edge 250 disposed at different locations along the length of the rocker insert 240. However, as illustrated in the example shown in FIGS. 10-12, the angled portions 268 of the second stiffening member 242 extend at a generally 90 degree angle before reaching the reinforcement rib 270 and then continuing the extend approximately perpendicular to the upper wall portion 262 and the lower wall portion 264. As such, the distance between the first upper wall portion 262 and the second upper wall portion 262 is approximately equal to the width of the lower wall portion 264. Similarly, as shown in FIG. 11, the distance between the first lower wall portion 264 and the second lower wall portion 264 is approximately equal to than the width of the upper wall portion 262.

Figure 16:
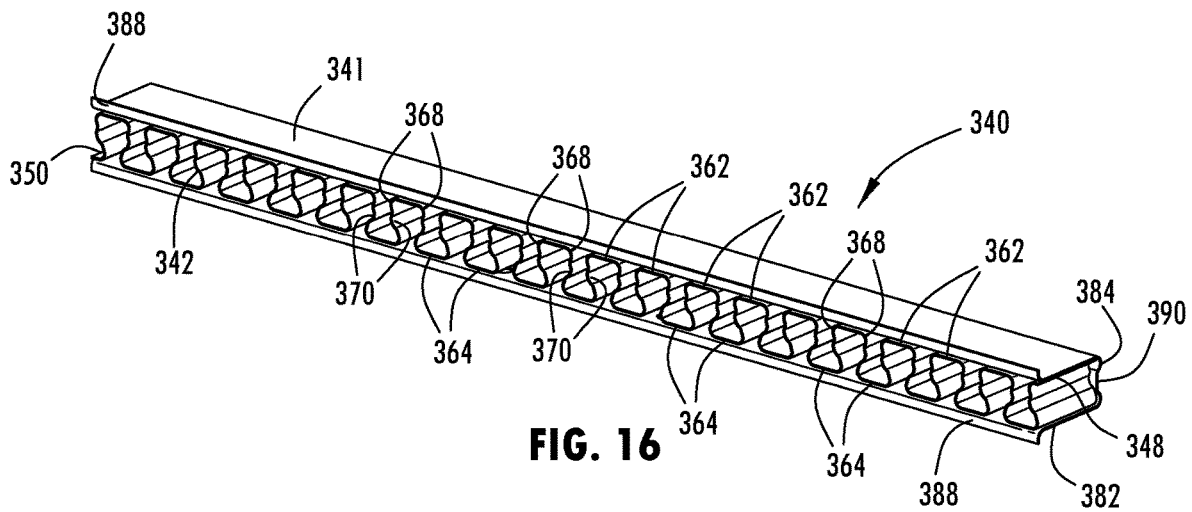
FIG. 16 is a perspective view of another example of the rocker insert.
Figure 17:
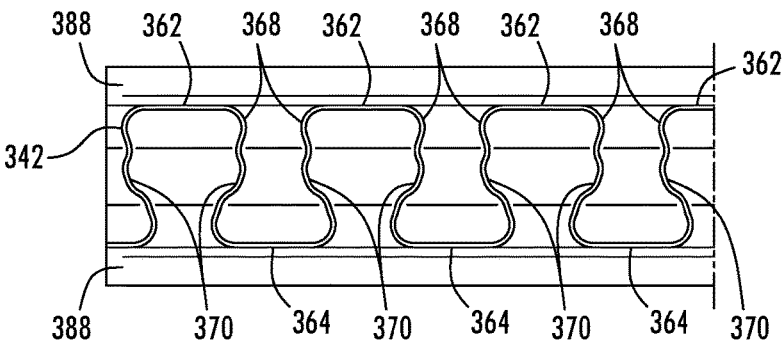
FIG. 17 is an enlarged side view of the rocker insert shown in FIG. 16.
Figure 18:
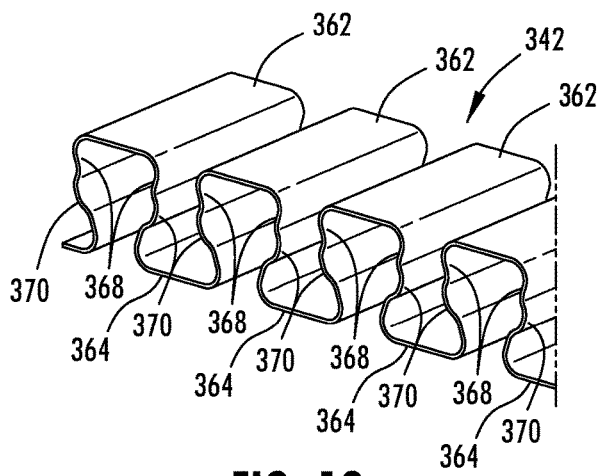
FIG. 18 is an enlarged perspective view of the second stiffening member of the rocker insert shown in FIG. 16.
Figure 19:
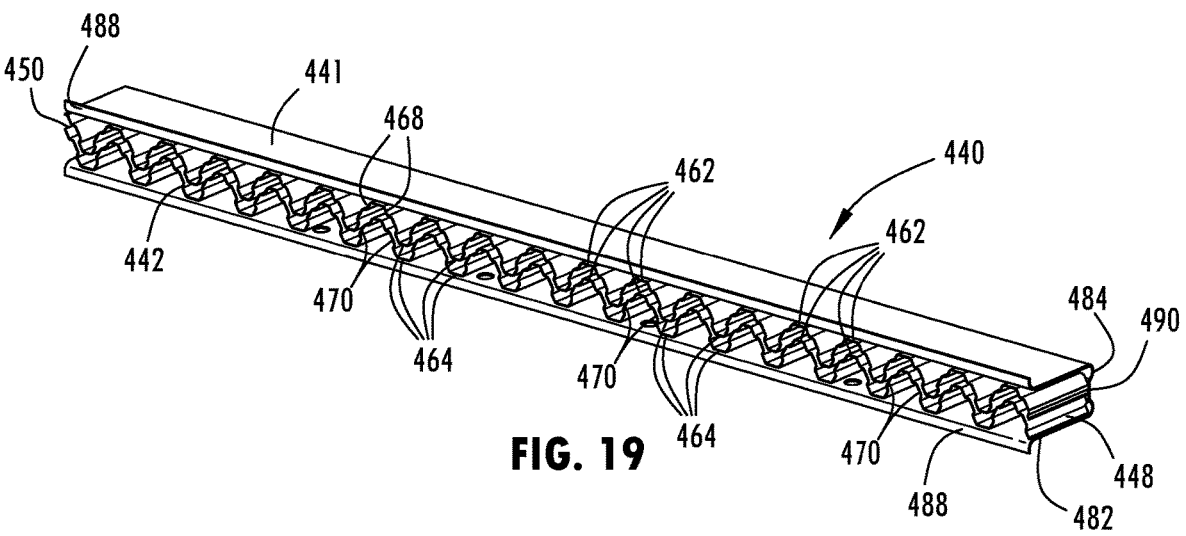
FIG. 19 is a perspective view of another example of the rocker insert.
Figure 20:
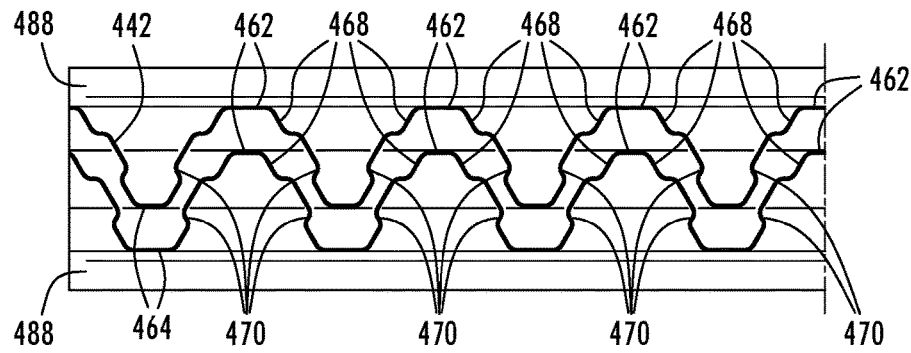
FIG. 20 is an enlarged side view of the rocker insert shown in FIG. 19.
Figure 21:
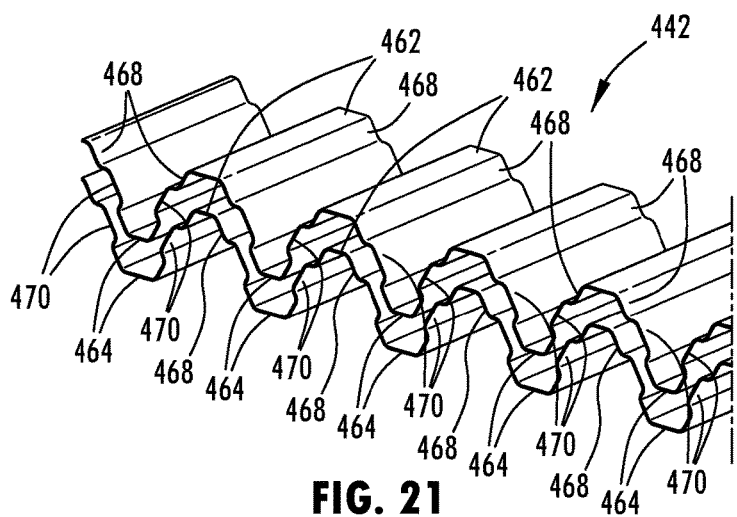
FIG. 21 is an enlarged perspective view of the second stiffening member of the rocker insert shown in FIG. 19.

Referring to the example shown in FIGS. 16-18, the rocker assembly 310 includes similar features to the features described above with respect to the rocker assembly 10 shown in FIGS. 1-9B, including but not limited to the sill outer, the sill inner, and the rocker insert 340 disposed within the elongated interior of the sill structure. The rocker insert 340 similarly includes a first stiffening member 341 defining a top wall 380, a bottom wall 382, and a side wall 384 integrally connecting between the top and bottom walls along with the rocker insert 340. The rocker insert 340 also similarly includes a second stiffening member 342 including the wall portion 346 with the fore edge 348 and the aft edge 350 disposed at different locations along the length of the rocker insert 340. However, as illustrated in the example shown in FIGS. 10-12, the angled portions 368 of the second stiffening member 342 extend at a generally 90 degree angle from the upper wall portion 362 before reaching the reinforcement rib 370 and then continuing inward from the reinforcement rib 370 and extending at an angle towards the upper wall portion 362. As such, the distance between the first upper wall portion 362 and the second upper wall portion 362 is less than the width of the lower wall portion 364. Similarly, as shown in FIG. 11, the distance between the first lower wall portion 364 and the second lower wall portion 364 is less than the width of the upper wall portion 362.

Referring to the example shown in FIGS. 19-22, the rocker assembly 410 includes similar features to the features described above with respect to the rocker assembly 10 shown in FIGS. 1-9B, including but not limited to the sill outer, the sill inner, and the rocker insert 440 disposed within the elongated interior of the sill structure. The rocker insert 440 similarly includes a first stiffening member 441 defining a top wall 480, a bottom wall 482, and a side wall 484 integrally connecting between the top and bottom walls along with the rocker insert 440. The rocker insert 440 also similarly includes a second stiffening member 424 that includes the wall portion 446 with the fore edge 448 and the aft edge 450 disposed at different locations along the length of the rocker insert 440. Additionally, the second stiffening member 424 is similar in shape to the shape described with respect to the example shown in FIGS. 1-9B. However, the second stiffening member 42 includes a second structure having an identical shape disposed within the interior. In this example, the upper wall portion 462 of the second stiffening member 424 is coupled to the top wall 80 of the first stiffening member 444. Additionally, the lower wall portion 464 of the second stiffening member 424 is coupled to the bottom wall 482 of the first stiffening member 441. As additionally shown in FIGS. 19-24, the reinforcement ribs 470 may have a more angular shape rather than the more curved shape shown in the example in FIGS. 1-9B. Moreover, it is contemplated that the reinforcement ribs 470 may be disposed on the angled portion at a location which is closer to the upper wall portion 462 or closer to the lower wall portion 464, as desired.

Figure 22:
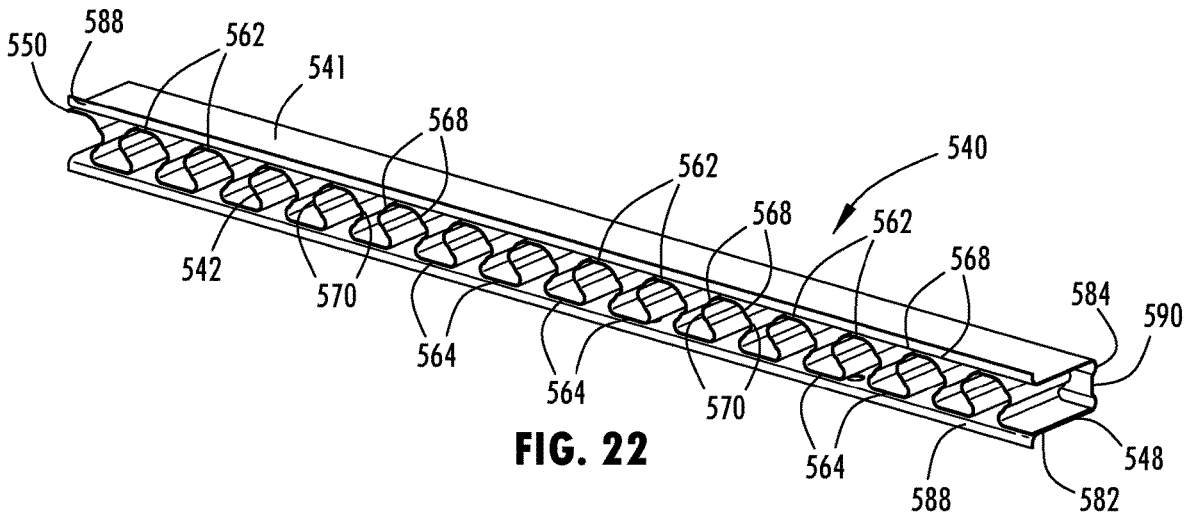
FIG. 22 is a perspective view of another example of the rocker insert.
Figure 23:
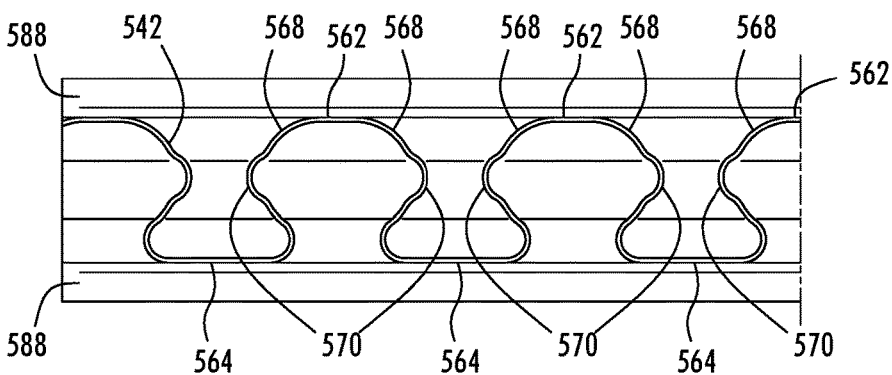
FIG. 23 is an enlarged side view of the rocker insert shown in FIG. 22.
Figure 24:
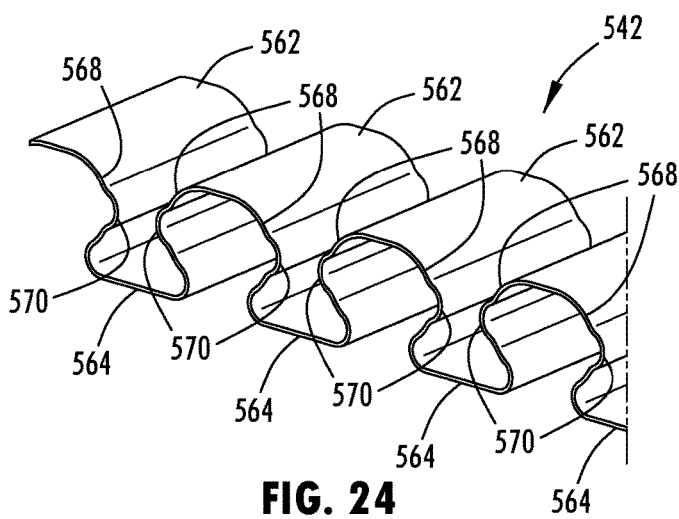
FIG. 24 is an enlarged perspective view of the second stiffening member of the rocker insert shown in FIG. 22.

Referring to the example shown in FIGS. 22-24, the rocker assembly 510 includes similar features to the features described above with respect to the rocker assembly 10 shown in FIGS. 1-9B, including but not limited to the sill outer, the sill inner, and the rocker insert 540 disposed within the elongated interior of the sill structure. The rocker insert 540 similarly includes a first stiffening member 541 defining a top wall 580, a bottom wall 582, and a side wall 584 integrally connecting between the top and bottom walls along with the rocker insert 540. The rocker insert 540 also similarly includes the second stiffening member 542 including the wall portion 546 with the fore edge 548 and the aft edge 550 disposed at different locations along the length of the rocker insert 540. However, as illustrated in the example shown in FIGS. 22-24, the angled portions 568 of the second stiffening member 542 extend at a greater angle than shown in FIGS. 1-9B. The angle of extension is greater than 90 degrees and may be in the range of 95-130 degrees. Additionally, once the reinforcement rib 570 is reached, the angled portion 568 extends back at a similar angle towards the lower wall portion 564. As such, the distance between the first upper wall portion 562 and the second upper wall portion 562 is approximately equal to the width of the lower wall portion 564. Similarly, as shown in FIG. 23, the distance between the first lower wall portion 564 and the second lower wall portion 564 is approximately equal to than the width of the upper wall portion 562.

Figure 25:
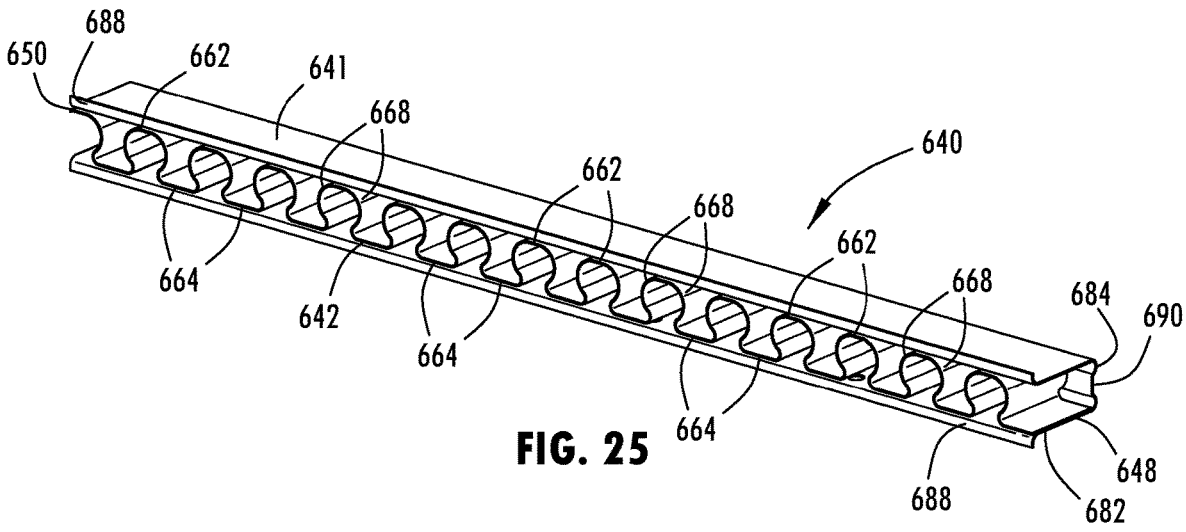
FIG. 25 is a perspective view of another example of the rocker insert.
Figure 26:
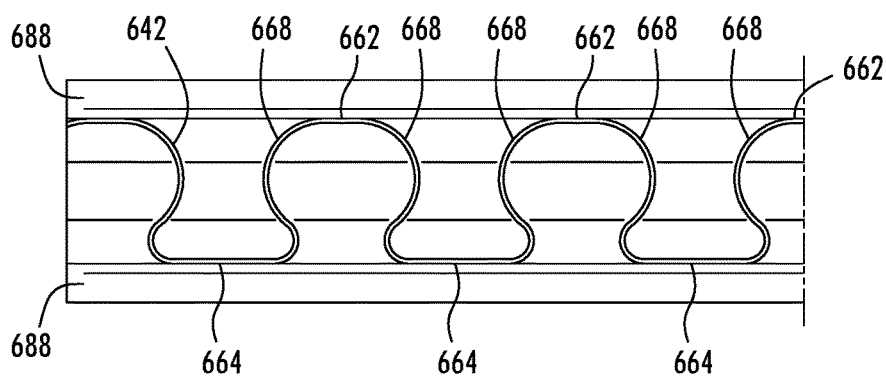
FIG. 26 is an enlarged side view of the rocker insert shown in FIG. 25.
Figure 27:
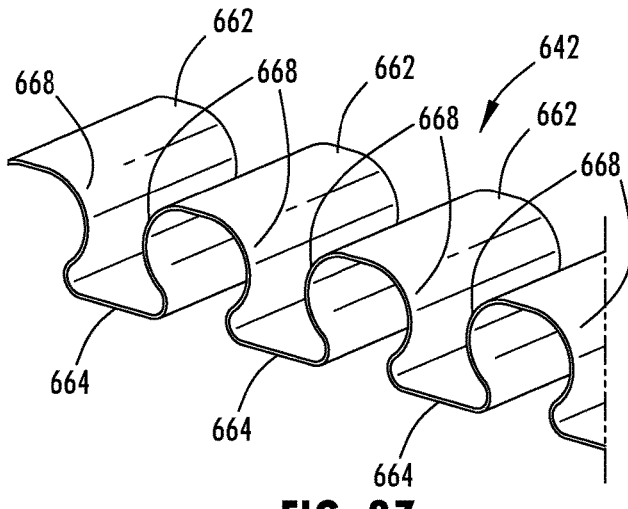
FIG. 27 is an enlarged perspective view of the second stiffening member of the rocker insert shown in FIG. 25.

Referring to the example shown in FIGS. 25-27, the rocker assembly 610 includes similar features to the features described above with respect to the rocker assembly 10 shown in FIGS. 1-9B, including but not limited to the sill outer, the sill inner, and the rocker insert 640 disposed within the elongated interior of the sill structure. The rocker insert 640 similarly includes the first stiffening member 641 having the top wall 680, the bottom wall 682, and the side wall 684 integrally connecting between the top and bottom walls along with the rocker insert 640. The rocker insert 640 also similarly includes the second stiffening member 642 having the wall portion 646 with the fore edge 648 and the aft edge 650 disposed at different locations along the length of the rocker insert 640. Additionally, the example shown in FIGS. 25-27 has a similar angle of extension of the angled portion as the example shown in FIGS. 22-24. However, as illustrated in the example shown in FIGS. 25-27, the angled portions 668 of the second stiffening member 642 do not include reinforcement ribs and instead have a smooth curve which extends from the upper wall portion 662 to the lower wall portion 664. As such, the distance between the first upper wall portion 662 and the second upper wall portion

662 is approximately equal to the width of the lower wall portion 664. Similarly, as shown in FIG. 23, the distance between the first lower wall portion 664 and the second lower wall portion 664 is approximately equal to than the width of the upper wall portion 662.

Figure 29:
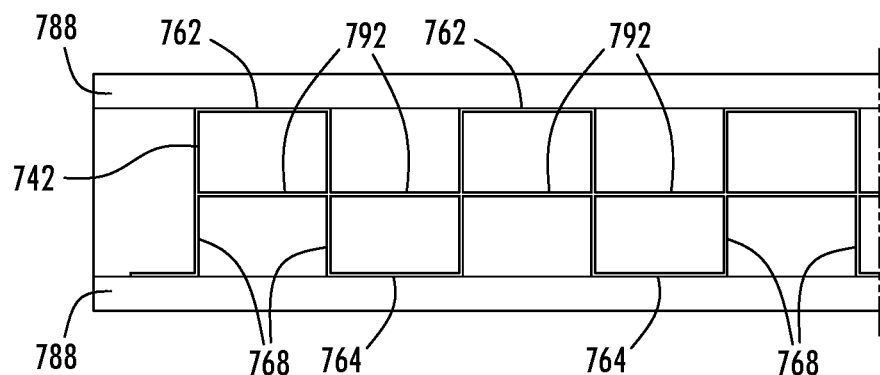
FIG. 29 is an enlarged side view of the rocker insert shown in FIG. 28.
Figure 30:
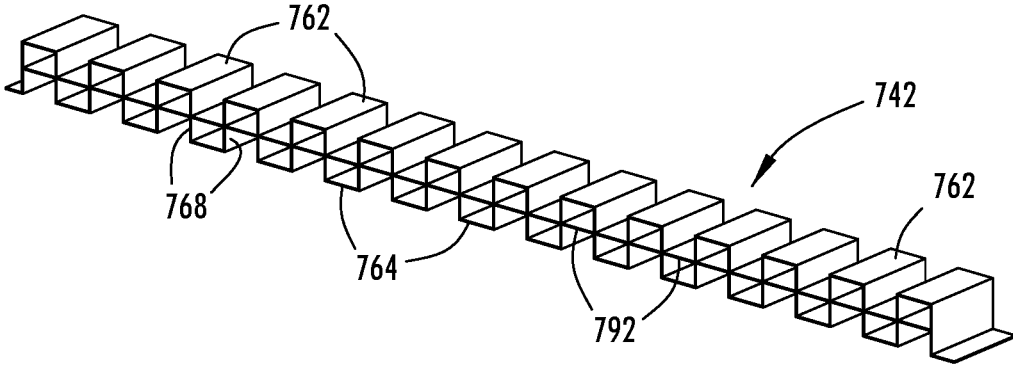
FIG. 30 is a perspective view of the second stiffening member of the rocker insert shown in FIG. 28.

Referring to the example shown in FIGS. 28-30, the rocker insert 740 includes similar features to the features described above with respect to the rocker assembly 10 and corresponding insert 40 shown in FIGS. 1-9B, including the first stiffening member 741 having a top wall 780, the bottom wall 782, and the side wall 784, along with the second stiffening member 742 including the plurality of wall sections 768 that each include an upper wall portion 762 engaged with the top wall 780 and a lower wall portion 764 engaged with the bottom wall 782 at a location spaced along the length of the rocker insert from the engagement of the upper wall portion. The plurality of wall sections 768 of the second stiffening member 742 extend orthogonal to the side wall 784 of the first stiffening member to axially align with an inboard lateral impact force to the vehicle. In some examples, the second stiffening member 742 may be an aluminum extrusion, such as shown in FIG. 28, which may provide additional shapes from those formed with a metal sheet. For example, as shown in FIG. 28, the extruded second stiffening member 742 includes intermediate walls 792 that extend between the wall sections 768 that span between and support the top and bottom walls 780, 782 of the first stiffening member. As such, the intermediate walls 792 provided in the extruded second stiffening member 742 can function to further reinforce the top and bottom walls 780, 782 relative to each other. Moreover, in additional examples, the second stiffening member when formed via extrusion may have various alternative cross-sectional shapes and features, such as a honeycomb or grid-like shape. Further, the second stiffening member when formed via extrusion may be segmented pieces along its length, such as pieces that are formed by cutting an elongated extrusion (with the walls sections being continuous along the length of the extrusion) into pieces and orienting them side-by-side along the channel of the first stiffening member. As such, the second stiffening member 742 may include an extrusion with the plurality of wall sections 768 disposed in the direction of extrusion, as shown in FIG. 28.

Figures 31, 32, 33:
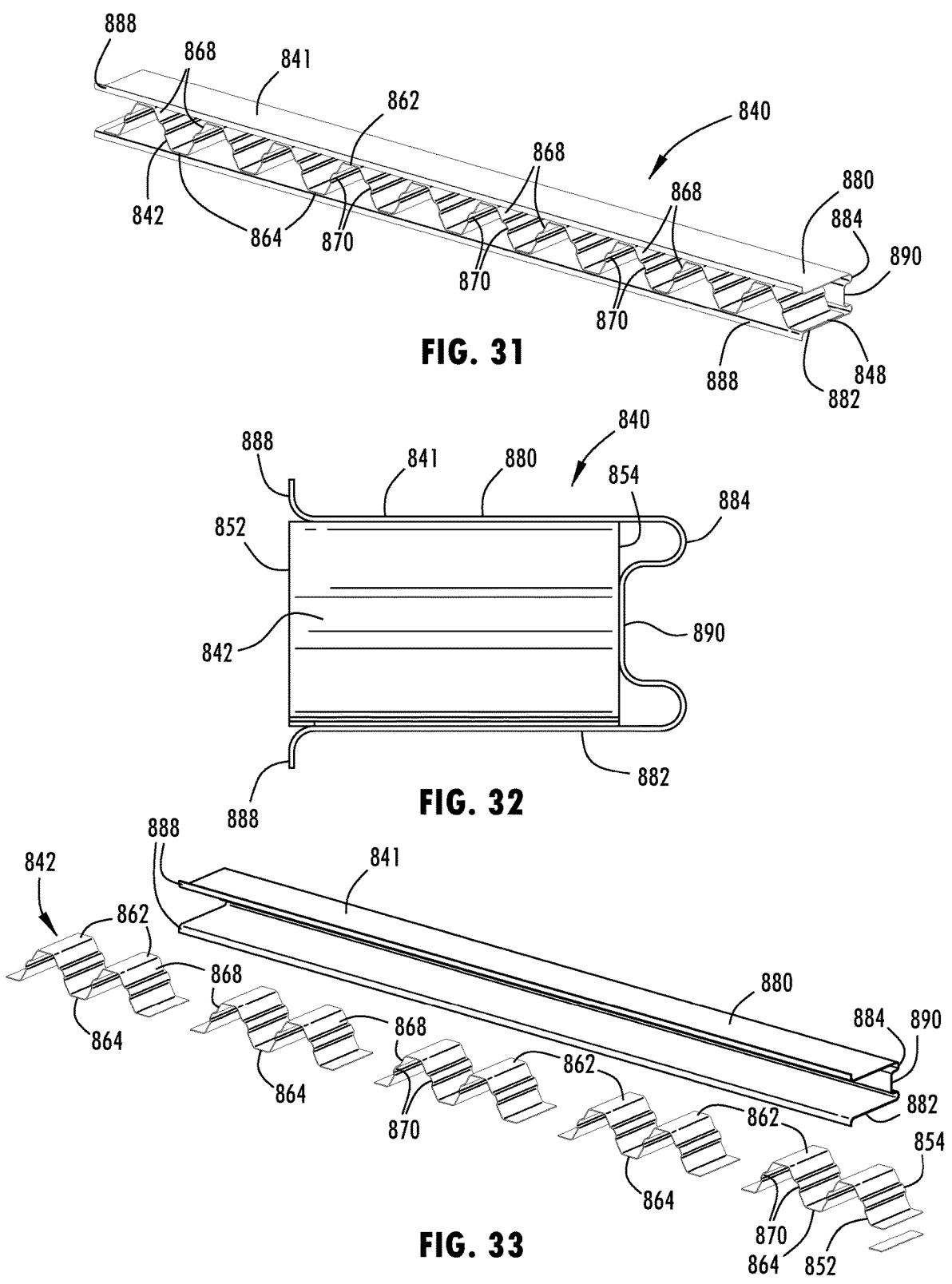
FIG. 31 is a perspective view of another example of the rocker insert.
FIG. 32 is an end view of the rocker insert shown in FIG. 31.
FIG. 33 is an exploded perspective view of the second stiffening member of the rocker insert shown in FIG. 31.

Referring to the example shown in FIGS. 31-33, the rocker assembly 810 includes similar features to the features described above with respect to the rocker assembly 10 shown in FIGS. 1-9B, including but not limited to the sill outer, the sill inner, and the rocker insert 840 disposed within the elongated interior of the sill structure. The rocker insert 840 similarly includes a first stiffening member 841 defining a top wall 880, a bottom wall 882, and a side wall 884 integrally connecting between the top and bottom walls along with the rocker insert 840. However, in comparison to the first stiffening member 41 in FIG. 3, the recessed portion 890 of the side wall 884 protrudes a greater distance or proportion toward the flanges 888 that connect to the inboard wall portion of the sill structure. In doing so, the interior space in the channel defined by the first stiffening member 841 is reduced so as to provide a shorter distance minimum distance for the second stiffening member 842 to extend between the recessed portion 890 and the inboard wall portion of the sill structure.

The rocker insert 840 shown in FIGS. 31-33 also similarly includes a second stiffening member 842 that includes the wall sections 846 that each include an upper wall portion 862 engaged with the top wall 880 and a lower wall portion 864 engaged with the bottom wall 882 at a location spaced along a length of the rocker insert from the upper wall portion 862. The wall sections 846 of the second stiffening member 842 extend orthogonal to the side wall 884 of the first stiffening member to axially align with an inboard lateral impact force to the vehicle. The wall sections 846 include angled portions that extend between the upper and lower wall portions 862, 864 to define a wave-shaped structure with crest portions at the upper wall portions 862 and trough portions at the lower wall portions 864, which alternates at spaced locations so as to repeat along the length of the rocker insert 840. However, different from the example shown in FIGS. 1-9B, the second stiffening member 842 is segmented on its length so as to be formed form a plurality of separate repeating sections along the length of the second stiffening member. These separate repeating sections are formed with the same shape, such that the sections may be formed in a single beam in the direction aligned with the direction of the walls and direction of potential inboard lateral impact and then cut along the beam's length to form the individual sections or segments.

Figures 34, 35, 36:
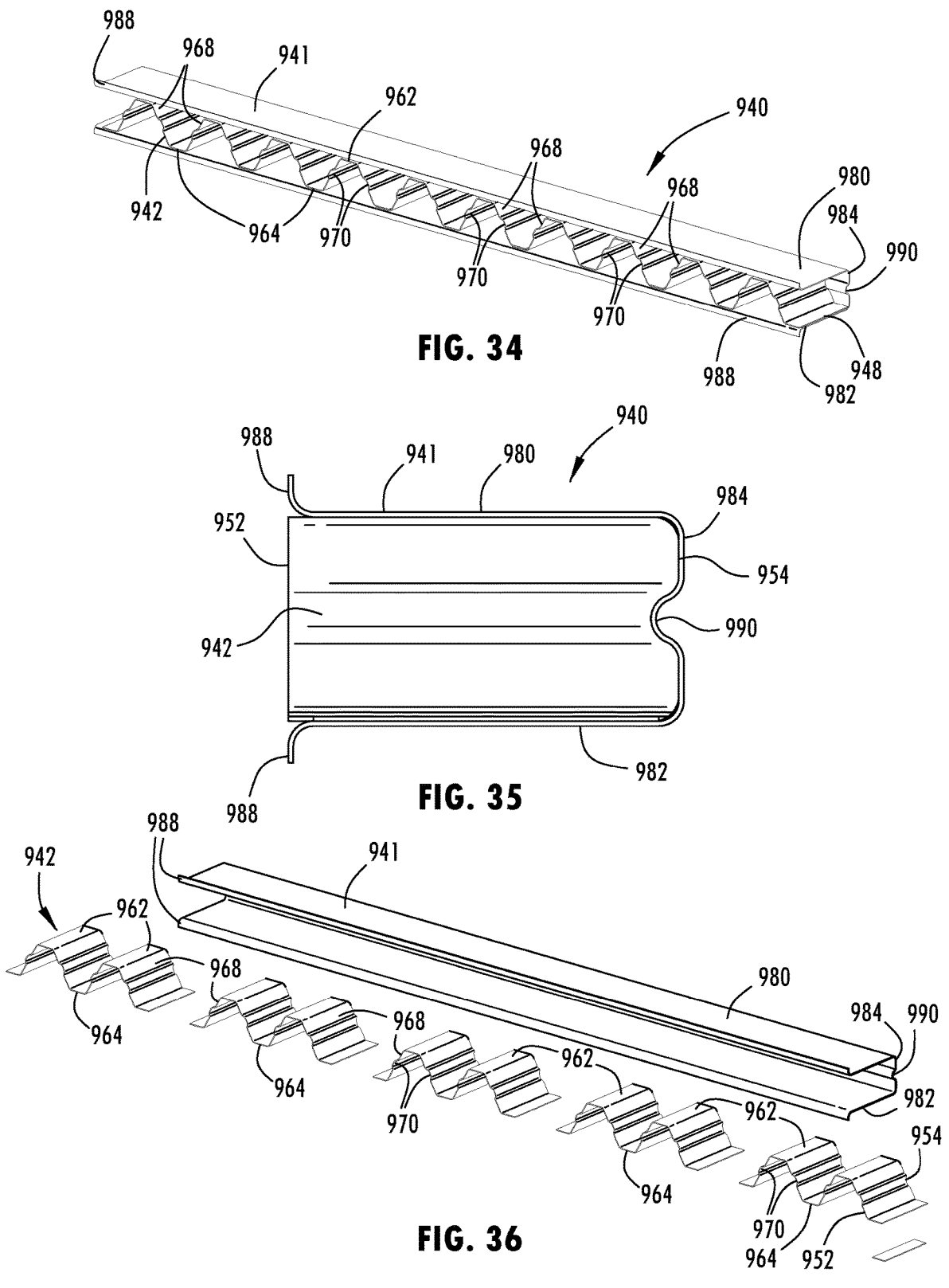
FIG. 34 is a perspective view of another example of the rocker insert.
FIG. 35 is an end view of the rocker insert shown in FIG. 34.
FIG. 36 is an exploded perspective view of the second stiffening member of the rocker insert shown in FIG. 34.

Referring to the example shown in FIGS. 34-36, the rocker assembly 910 includes similar features to the features described above with respect to the rocker assembly 810 shown in FIGS. 31-33, including but not limited to the sill outer, the sill inner, and the rocker insert 940 configured to be disposed within the elongated interior of the sill structure. The rocker insert 940 similarly includes a first stiffening member 941 defining a top wall 980, a bottom wall 982, and a side wall 984 integrally connecting between the top and bottom walls along with the rocker insert 840. The rocker insert 940 also similarly includes a second stiffening member 942 that includes the wall sections 946 that include an upper wall portion 962, a lower wall portion 964, and angled portions that extend between the upper and lower wall portions 962, 964 to define a wave-shaped structure. Further, the second stiffening member 942 is also segmented along its length so as to be formed form a plurality of separate repeating sections. However, the recessed portion 990 of the side wall 984, as shown in FIG. 35 protrudes a lesser distance toward the flanges 988 and has a shorter height on the side wall 984. The recessed portion 990 forms a non-planar formation along the length of the rocker insert 940, and an outboard edge of the second stiffening member 942 is shaped to conform to the non-planar formation. More specifically, the shape of the outboard edge of the second stiffening member generally fits into and mates with the shape provided by the side wall 984.

Figures 37, 38, 39:
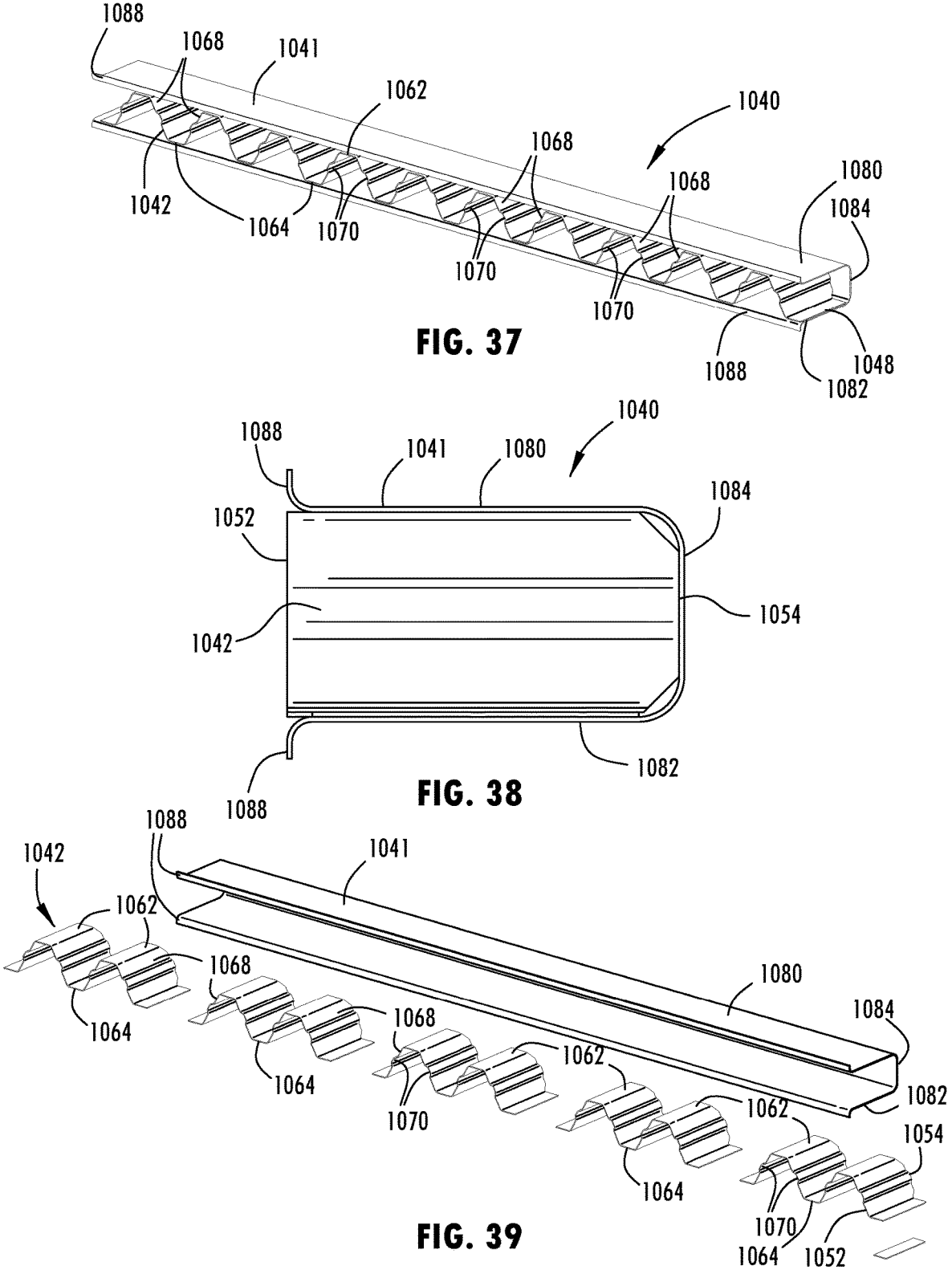
FIG. 37 is a perspective view of another example of the rocker insert.
FIG. 38 is an end view of the rocker insert shown in FIG. 37.
FIG. 39 is an exploded perspective view of the second stiffening member of the rocker insert shown in FIG. 37.

Referring to the example shown in FIGS. 37-39, the rocker assembly 1010 includes similar features to the features described above with respect to the rocker assembly 810 shown in FIGS. 31-33, including but not limited to the sill outer, the sill inner, and the rocker insert 1040 configured to be disposed within the elongated interior of the sill structure. The rocker insert 1040 similarly includes a first stiffening member 1041 defining a top wall 1080, a bottom wall 1082, and a side wall 1084 integrally connecting between the top and bottom walls along with the rocker insert 1040. The rocker insert 1040 also similarly includes a second stiffening member 1042 that includes the wall sections 1046 that define a wave-shaped structure. Further, the second stiffening member 1042 is also segmented along its length so as to be formed form a plurality of separate repeating sections. However, the side wall 1084 lacks any recessed portion or formation, such as to have a substantially planar shape, as shown in FIG. 38. The outboard edge of the second stiffening member 1042 is shaped to conform to the planar formation, although the upper and lower outboard corners of the second stiffening member 1042 have a chamfered angle that avoids interacting with the curved upper and lower corners on the first stiffening member that separate the side wall 1084 from the top wall 1080 and the bottom wall 1082.

Figures 40, 41, 42:
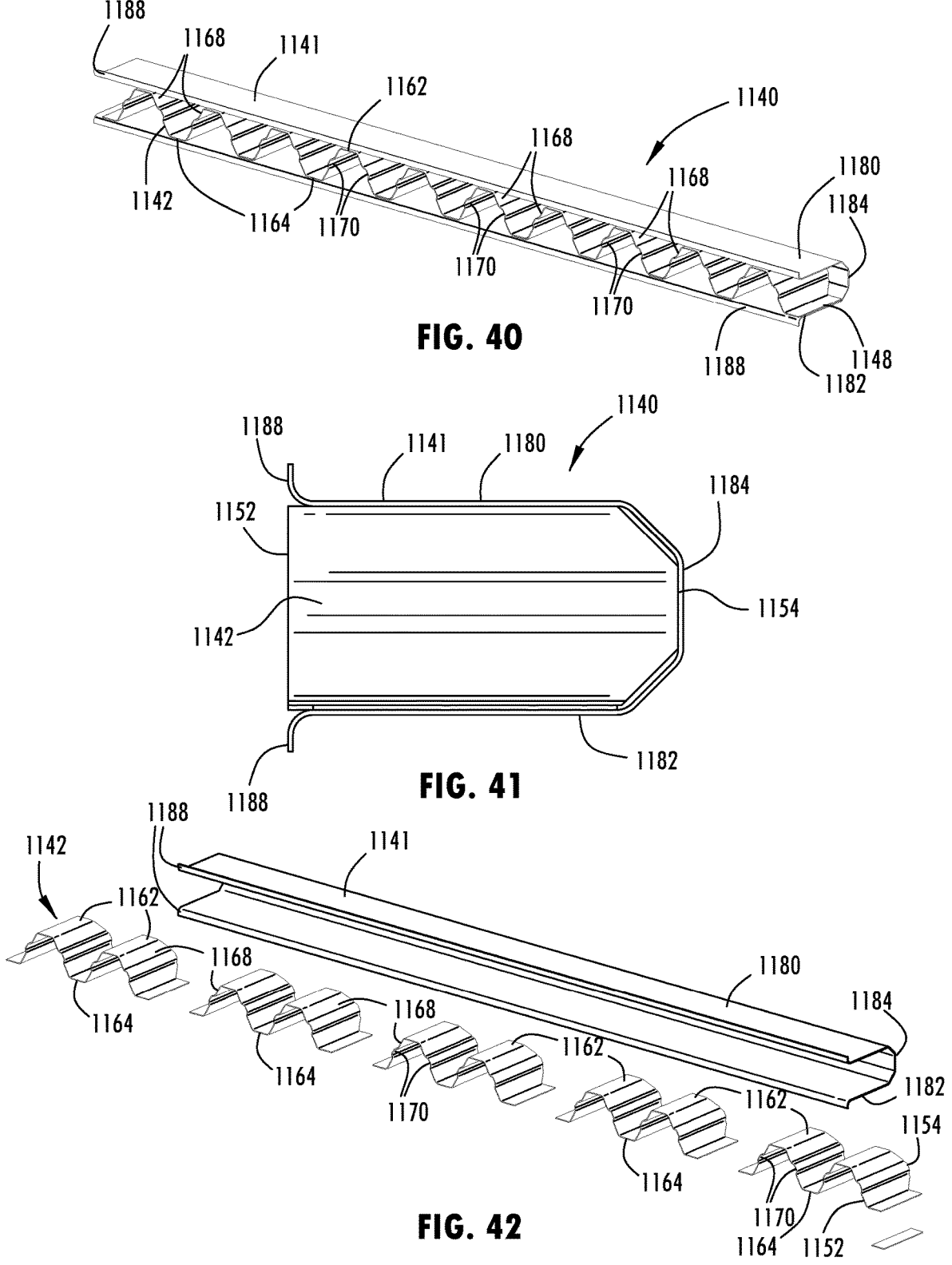
FIG. 40 is a perspective view of another example of the rocker insert.
FIG. 41 is an end view of the rocker insert shown in FIG. 40.
FIG. 42 is an exploded perspective view of the second stiffening member of the rocker insert shown in FIG. 40.

Referring to the example shown in FIGS. 40-42, the rocker assembly 1110 includes similar features to the features described above with respect to the rocker assembly 1010 shown in FIGS. 37-39, including but not limited to the sill outer, the sill inner, and the rocker insert 1140 configured to be disposed within the elongated interior of the sill structure. The rocker insert 1140 similarly includes a first stiffening member 1141 defining a top wall 1180, a bottom wall 1182, and a side wall 1184 integrally connecting between the top and bottom walls along with the rocker insert 1140. The rocker insert 1140 also similarly includes a second stiffening member 1142 that includes the wall sections 1146 that define a wave-shaped structure. In addition, the second stiffening member 1142 is also segmented along its length so as to be formed form a plurality of separate repeating sections. Further, the side wall 1184 also lacks a recessed portion or formation and the outboard edge of the second stiffening member 1142 is shaped to conform to the planar formation. However, upper and lower corners on the first stiffening member 1142 that separate the side wall 1184 from the top wall 1180 and the bottom wall 1182 have a chamfered shape that corresponds to the chamfered angle at the upper and lower outboard corners of the second stiffening member 1142.

It is also contemplated that the internal reinforcements of the disclosed vehicle rocker assembly may be incorporated in other types of structural beams, such as in frames and structures of automotive and marine vehicles, buildings, storage tanks, furniture, and the like. With respect to vehicle applications, the vehicle component disclosed herein may be incorporated with various applications of different structural components. The vehicle component may be designed to support and sustain different loading conditions, such as for supporting certain horizontal spans or axial loading conditions. Also, the vehicle component may be designed to undergo various impact forces, such as for the illustrated rocker assemblies, pillar structures, and the like. The cross-sectional geometry, material type selections, and material thickness within the cross-sectional profile of the vehicle component may be configured for such a particular use and the desired loading and performance characteristics, such as the weight, load capacity the beam, force deflection performance, and impact performance of the vehicle component.

For purposes of this disclosure, the term "coupled" (in all of its forms, couple, coupling, coupled, etc.) generally means the joining of two components directly or indirectly to one another. Such joining may be stationary in nature or movable in nature; may be achieved with the two components and any additional intermediate members being integrally formed as a single unitary body with one another or with the two components; and may be permanent in nature or may be removable or releasable in nature, unless otherwise stated.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A rocker assembly for a vehicle, the rocker assembly comprising:
    a sill structure having an inboard wall portion and an outboard wall portion defining an elongated interior there between; and
    a rocker insert disposed within the elongated interior of the sill structure, the rocker insert comprising:
        a first stiffening member having a top wall, a bottom wall, and a side wall extending between the top wall and the bottom wall, wherein the top wall, the bottom wall, and the side wall define a channel, and wherein the side wall includes a recessed portion that protrudes inward toward the inboard wall portion of the sill structure; and
        a second stiffening member disposed at least partially within the channel and comprising a plurality of wall sections that each include an upper wall portion engaged with the top wall and a lower wall portion engaged with the bottom wall at a location spaced along a length of the rocker insert from the upper wall portion, wherein the plurality of wall sections of the second stiffening member extend orthogonal to the side wall of the first stiffening member to axially align with an inboard lateral impact force to the vehicle.

2. The rocker assembly of claim 1, wherein the top wall includes a flange portion extending at an angle from a remainder of the top wall.

3. The rocker assembly of claim 1, wherein the bottom wall includes a flange portion extending at an angle from a remainder of the bottom wall that is disposed parallel to the top wall.

4. The rocker assembly of claim 1, wherein the top wall includes a flange portion extending at a first angle from a remainder of the top wall and the bottom wall includes a flange portion extending at a second angle from a remainder of the bottom wall.

5. The rocker assembly of claim 4, wherein one or both of the flange portion of the top wall and the flange portion of the bottom wall are coupled to the inboard wall portion of the sill structure.

6. The rocker assembly of claim 1, wherein the top and bottom walls of the first stiffening member are configured to support the second stiffening member when undergoing the inboard lateral impact force.

7. The rocker assembly of claim 1, wherein the upper wall portion of each of the plurality of wall sections engages at a first location along the length of the rocker insert and the lower wall portion engaged a second location along the length of the rocker insert, and wherein a distance between the first and second locations is substantially the same for each of the plurality of wall sections along the rocker insert.

8. The rocker assembly of claim 1, wherein the second stiffening member comprises a length that extends greater than 50% of a length of the first stiffening member.

9. The rocker assembly of claim 1, wherein the second stiffening member comprises a metal sheet with a length extending along a longitudinal extent of the hollow interior, and wherein the plurality of wall sections define a wave-shaped structure with crest portions and trough portions alternating at spaced locations along the length of the metal sheet.

10. A rocker insert configured to be disposed along an elongated hollow interior of a vehicle sill structure, the rocker insert comprising:
    a first stiffening member having a top wall, a bottom wall, and a side wall integrally extending between the top wall and the bottom wall, wherein the top wall, the bottom wall, and the side wall together define a channel; and
    a second stiffening member disposed at least partially within the channel and comprising a plurality of wall sections that each include an upper wall portion engaged with the top wall and a lower wall portion engaged with the bottom wall at a location spaced along a length of the rocker insert from the upper wall portion,
    wherein the plurality of wall sections of the second stiffening member extend orthogonal to the side wall of the first stiffening member to axially align with an inboard lateral impact force to the vehicle sill structure,
    wherein the plurality of wall sections include angled portions that extend between the upper and lower wall portions and are configured to support the top and bottom walls of the first stiffening member when undergoing the inboard lateral impact force, and
    wherein the side wall of the first stiffening member includes a non-planar formation along the length of the rocker insert, and wherein an outboard edge of the second stiffening member is shaped to conform to the non-planar formation.

11. The rocker insert of claim 10, wherein the top wall includes a flange portion extending at an angle from a remainder of the top wall, the flange portion configured to couple with an inboard wall of the vehicle sill structure.

12. The rocker insert of claim 10, wherein the bottom wall includes a flange portion extending at an angle from a remainder of the bottom wall that is disposed parallel to the top wall.

13. The rocker insert of claim 10, wherein the top wall includes an upper flange portion extending at a first angle from a remainder of the top wall and the bottom wall includes a lower flange portion extending at a second angle from a remainder of the bottom wall.

14. The rocker insert of claim 10, wherein the upper wall portion of each of the plurality of wall sections engages at a first location along the length of the rocker insert and the lower wall portion engaged a second location along the length of the rocker insert, and wherein a distance between the first and second locations is substantially the same for each of the plurality of wall sections along the rocker insert.

15. The rocker insert of claim 10, wherein the second stiffening member comprises a plurality of separate repeating sections along the length of the second stiffening member.

16. The rocker insert of claim 10, wherein the second stiffening member comprises a metal sheet with a length extending along a longitudinal extent of the hollow interior, and wherein the plurality of wall sections define a wave-shaped structure with crest portions and trough portions alternating at spaced locations along the length of the metal sheet.

17. A vehicle beam component comprising:

a first stiffening member having a top wall, a bottom wall disposed parallel to the top wall, and a side wall extending between the top wall and the bottom wall, wherein the top wall, the bottom wall, and the side wall define a channel, wherein the side wall includes a recessed portion that protrudes inward to the channel; and a second stiffening member disposed at least partially within the channel and comprising a plurality of wall sections that each include an upper wall portion engaged with the top wall and a lower wall portion engaged with the bottom wall at a location spaced along a length of the vehicle beam component from the engagement with the upper wall portion, wherein the plurality of wall sections include angled portions that extend between the upper and lower wall portions and are configured to support the top and bottom walls of the first stiffening member when undergoing the inboard lateral impact force, and wherein the top and bottom walls of the first stiffening member are configured to be supported by the second stiffening member when undergoing an inboard lateral impact force.

18. The vehicle beam component of claim 17, wherein the plurality of wall sections of the second stiffening member extend orthogonal to the side wall of the first stiffening member to substantially align with the inboard lateral impact force, and wherein the second stiffening member comprises a plurality of separate repeating sections along the length of the vehicle beam component.

\* \* \* \* \*